(12) United States Patent
Takahashi et al.

(10) Patent No.: US 10,091,666 B2
(45) Date of Patent: Oct. 2, 2018

(54) METHOD AND APPARATUS FOR HANDOVER CONTROL IN A DIRECTIONAL COMMUNICATION SYSTEM

(71) Applicant: Panasonic Corporation, Osaka (JP)

(72) Inventors: Hiroshi Takahashi, Kanagawa (JP);
Naganori Shirakata, Kanagawa (JP);
Masataka Irie, Kanagawa (JP)

(73) Assignee: Panasonic Corporation, Osaka (JP)

( * ) Notice: Subject to any disclaimer, the term of this patent is extended or adjusted under 35 U.S.C. 154(b) by 26 days.

(21) Appl. No.: 15/403,850

(22) Filed: Jan. 11, 2017

(65) Prior Publication Data
US 2017/0208480 A1 Jul. 20, 2017

(30) Foreign Application Priority Data
Jan. 19, 2016 (JP) .................. 2016-007887

(51) Int. Cl.
| | | |
|---|---|---|
| H04B 7/0491 | (2017.01) | |
| H04W 16/28 | (2009.01) | |
| H04W 36/00 | (2009.01) | |
| H04B 7/06 | (2006.01) | |
| H04W 36/30 | (2009.01) | |
| H04W 36/06 | (2009.01) | |

(52) U.S. Cl.
CPC .......... *H04W 16/28* (2013.01); *H04B 7/0491* (2013.01); *H04B 7/0695* (2013.01); *H04W 36/0005* (2013.01); *H04W 36/30* (2013.01); *H04W 36/06* (2013.01)

(58) Field of Classification Search
CPC .... H04B 7/0491; H04B 7/0695; H04W 16/28
See application file for complete search history.

(56) References Cited

U.S. PATENT DOCUMENTS

| | | | | |
|---|---|---|---|---|
| 2015/0351103 A1* | 12/2015 | Kim | ............... | H04W 16/28 455/452.1 |
| 2016/0150435 A1* | 5/2016 | Baek | ............... | H04W 16/28 370/252 |
| 2017/0033916 A1* | 2/2017 | Stirling-Gallacher | ............... | H04L 5/1438 |

(Continued)

FOREIGN PATENT DOCUMENTS

JP 2011-004225 A 1/2011

OTHER PUBLICATIONS

IEEE Computer Society, "Part 15.3: Wireless Medium Access Control (MAC) and Physical Layer (PHY) Specifications for High Rate Wireless Personal Area Networks (WPANs)," IEEE Std 802.15.3c, Oct. 12, 2009, 203 pages.

*Primary Examiner* — Scott M Sciacca
(74) *Attorney, Agent, or Firm* — Seed IP Law Group LLP

(57) ABSTRACT

A wireless communication device is provided with: 1st to Mth communication processing circuitry, corresponding to 1st to Mth sectors (where M≥2), which in operation, each communicate with a wireless terminal by using a beam in any of N directions (where N≥2); and handover control circuitry, which in operation, instructs the 2nd communication processing circuitry corresponding to the 2nd sector to change a beam used for beacon transmission to a beam closest to a boundary between the 1st sector and an adjacent the 2nd sector, and switch a communication partner of the wireless terminal from the 1st communication processing circuitry to the 2nd communication processing circuitry.

8 Claims, 15 Drawing Sheets

(56) References Cited

U.S. PATENT DOCUMENTS

2017/0273065 A1\* 9/2017 Stirling-Gallacher ........................ H04W 72/1226
2018/0070363 A1\* 3/2018 Chakraborty ....... H04W 72/048

\* cited by examiner

| STA ID | BEAM ID | RSSI | MCS |
|--------|---------|------|-----|
| STA 1  | 5       | 8    | 9   |
| ...    | ...     | ...  | ... |
| ...    | ...     | ...  | ... |
| ALL    | 3       | —    | 0   |

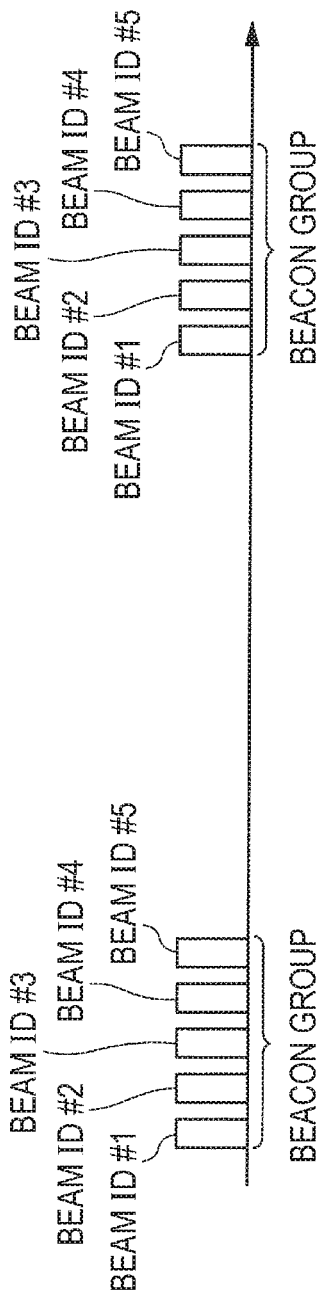
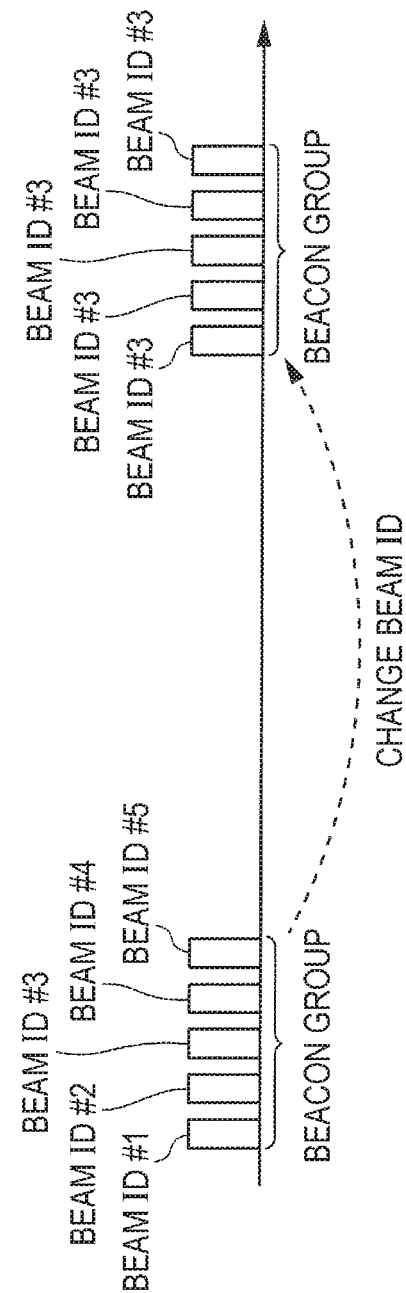

METHOD AND APPARATUS FOR HANDOVER CONTROL IN A DIRECTIONAL COMMUNICATION SYSTEM

BACKGROUND

1. Technical Field

The present disclosure relates to a wireless communication device, a wireless communication method, a control device, and a control method by which a wireless terminal conducts handover.

2. Description of the Related Art

Recently, millimeter wave communication, which does not require a license and which uses wireless signals in the 60 GHz band enabling high-speed communication, has been a subject of attention.

Wireless local area network (LAN) and personal area network (PAN) standards implementing millimeter wave communication include, for example, Wireless Gigabit (Wi-Gig), IEEE 802.15.3c, Wireless High Definition (HD), ECMA-387, and IEEE 802.11ad.

Wireless signals in the millimeter wave band have the radio wave characteristics of strong linearity and large spatial attenuation. For this reason, much millimeter wave communication, including the above standards, use beamforming technology to control the directionality of the wireless signal by using multiple antennas.

Beamforming technology controls the direction and width of a beam, which is a communication area having directionality, and cause the beam to track the position of the wireless terminal acting as the communication peer. In addition, if multiple wireless terminals exist in a range where a beam may be formed, a millimeter wave communication device using beamforming technology enables multiple wireless terminals to connect by changing the beam direction according to time division.

As a communication system using wireless communication, there is known a system in which a wireless terminal makes a wireless connection to a wireless access point connected to a communication network, for example. In such a communication system, if the wireless terminals goes outside the communication area of the wireless access point, a break in the connection is avoided by changing the connection target to another wireless access point (see Japanese Patent No. 5305453, for example).

SUMMARY

Meanwhile, in the case in which a millimeter wave communication device having directionality is a wireless access point, it is difficult for the wireless terminal to receive beacons, even if the wireless terminal performs a scan for beacons transmitted by wireless access points in order to switch the connection target (communication partner). For this reason, the technology related to handover for the omnidirectional communication of the related art (for example, Japanese Patent No. 5305453) is inadequate for millimeter wave communication.

One non-limiting and exemplary embodiment provides a wireless communication device, a wireless communication method, a control device, and a control method capable of minimizing reductions in communication efficiency, even for handover between access points having directionality.

In one general aspect, the techniques disclosed here feature a wireless communication device, including: 1st to Mth communication processing circuitry, respectively corresponding to 1st to Mth sectors (where M is an integer equal to or greater than 2), which in operation, each communicate with a wireless terminal by using a beam in any of N directions (where N is an integer equal to or greater than 2) in each sector; and handover control circuitry, which in operation, instructs the 2nd communication processing circuitry corresponding to the 2nd sector to change a beam used for beacon transmission to a beam closest to a boundary between the 1st sector and the 2nd sector from among the beams in N directions, and switch a communication partner of the wireless terminal from the 1st communication processing circuitry to the 2nd communication processing circuitry, in a case where all of (i) to (ii) are satisfied: (i) the beam used by the 1st communication processing circuitry corresponding to the 1st sector adjacent to the 2nd sector is a beam up to a Kth beam (where K is an integer equal to or greater than 1, and less than or equal to N/2) from the boundary from among the beams in N directions, and (ii) a communication quality between the 1st communication processing circuitry and the wireless terminal is less than or equal to a threshold value.

It should be noted that general or specific embodiments may be implemented as a system, a method, an integrated circuit, a computer program, a storage medium, or any selective combination thereof.

According to an aspect of the present disclosure, it is possible to minimize reductions in communication efficiency, even for handover between access points having directionality.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 16A is a diagram illustrating an example of a beacon transmission method; and FIG. 16B is a diagram illustrating an example of a beacon transmission method.

Figure 1:
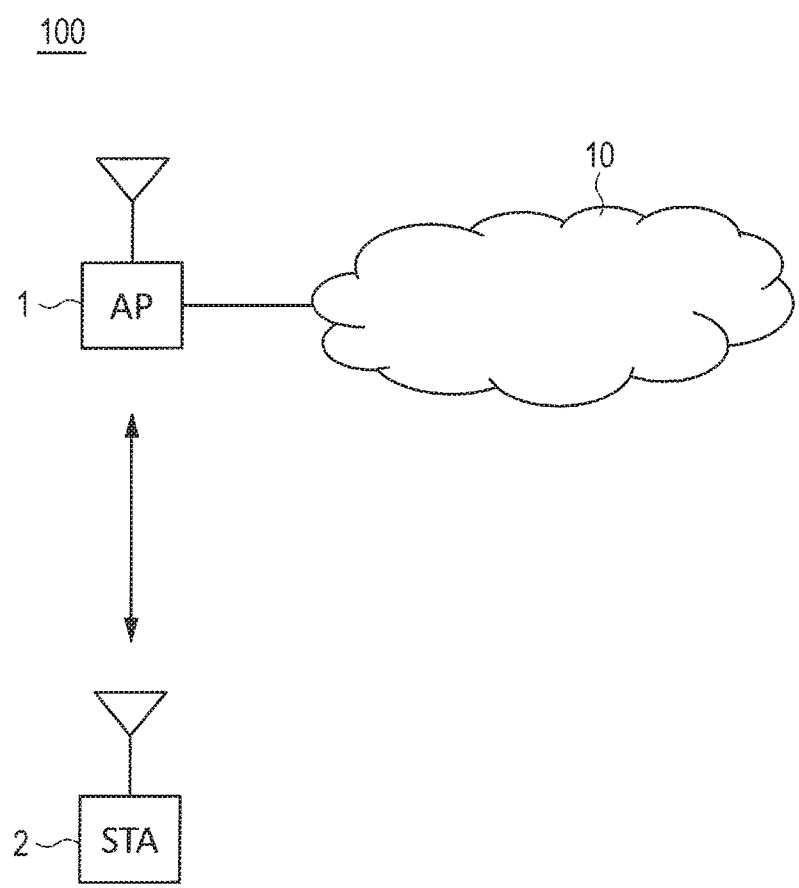
FIG. 1 is a system configuration diagram illustrating an example of the configuration of a communication system including a wireless communication device according to Embodiment 1 of the present disclosure.

DETAILED DESCRIPTION (Background Leading Up to the Present Disclosure)

First, the background leading up to the present disclosure will be described. The present disclosure relates to a wireless communication device, a wireless communication method, a control device, and a control method by which a wireless terminal conducts handover.

Specifically, a wireless communication device, a wireless communication method, a control device, and a control method according to the present disclosure relate to a wireless access point that uses beamforming technology to transmit and receive wireless signals in the millimeter-wave band with narrow directionality.

In the case of using a millimeter wave communication device, which conducts wireless communication in the millimeter-wave band with narrow directionality, as a wireless access point to a communication network such as the Internet, it is difficult for a single millimeter wave communication device to cover the full perimeter as the communication area. For this reason, a method of combining multiple millimeter wave communication devices to cover the full perimeter is conceivable, but measures are demanded to address the handover (changing the connected access point) of wireless terminals among the multiple millimeter wave communication devices.

Regarding omnidirectional communication, technology for realizing high-speed switching of the connected access point is described in Japanese Patent No. 5305453, for example. In the technology described in Japanese Patent No. 5305453 (hereinafter designated the "technology of the related art"), an access point announces, to the wireless terminals connected to that access point, information related to other access points present nearby (the wireless channels being used, the Basic Service Set Identifier (BSSID), and the Extended Service Set Identifier (ESSID)). To change the connected access point to another access point, a wireless terminal narrows down the wireless channels to scan, based on the announced information.

With omnidirectional communication, according to the technology of the related art, a wireless terminal is able to shorten the time taken to connect to another access point, and achieve high-speed switching of the connected access point.

However, in the case of using a millimeter wave communication device having directionality as a wireless access point, since the directionality is narrow, it is difficult for a wireless terminal to receive beacons, even if the wireless terminal performs a scan for beacons transmitted by wireless access points in order to switch from the connected wireless access point to another wireless access point.

In other words, since the wireless terminal has difficulty discovering access points to newly connect to, switching access points becomes difficult. In the technology of the related art, with millimeter wave communication having directionality (that is, the directionality is narrow), a phenomenon occurs in which it is difficult to receive beacons transmitted by access points in order to switch the connected access point, and in which it is difficult to connect to a new access point.

In light of such circumstances, for handover between access points having directionality, attention was focused on being able to select an access point to newly connect to, based on the directionality of the access point, which thereby led to the present disclosure.

Hereinafter, exemplary embodiments of the present disclosure will be described in detail and with reference to the drawings. Note that each of the embodiments described hereinafter is an example, and the present disclosure is not limited to these embodiments.

Embodiment 1

Embodiment 1 of the present disclosure will be described in detail and with reference to the drawings.

<Configuration of System>

FIG. 1 is a system configuration diagram illustrating an example of the configuration of a communication system 100 including a wireless communication device 1 according to the present embodiment. As illustrated in FIG. 1, the communication system 100 includes a communication network 10 such as the Internet, a wireless communication device (access point (AP)) 1 connected to the communication network 10, and a wireless terminal (station (STA)) 2 that connects to the communication network 10 through the wireless communication device 1.

The wireless communication device 1 and the wireless terminal 2 are communication devices supporting the IEEE 802.11ad millimeter wave communication standard. The wireless communication device 1 functions as an access point of the wireless terminal 2 to the communication network 10. More specifically, the wireless communication device 1 connects to the wireless terminal 2 by communicating wirelessly with the wireless terminal 2 by beamforming, and forwards data between the wireless terminal 2 and the communication network 10. In other words, the wireless communication device 1 manages access to the communication network 10 by the wireless terminal 2. FIG. 1 illustrates a state in which the wireless communication device 1 is connected to the wireless terminal 2.

<Configuration Wireless Communication Device>

Figure 2:
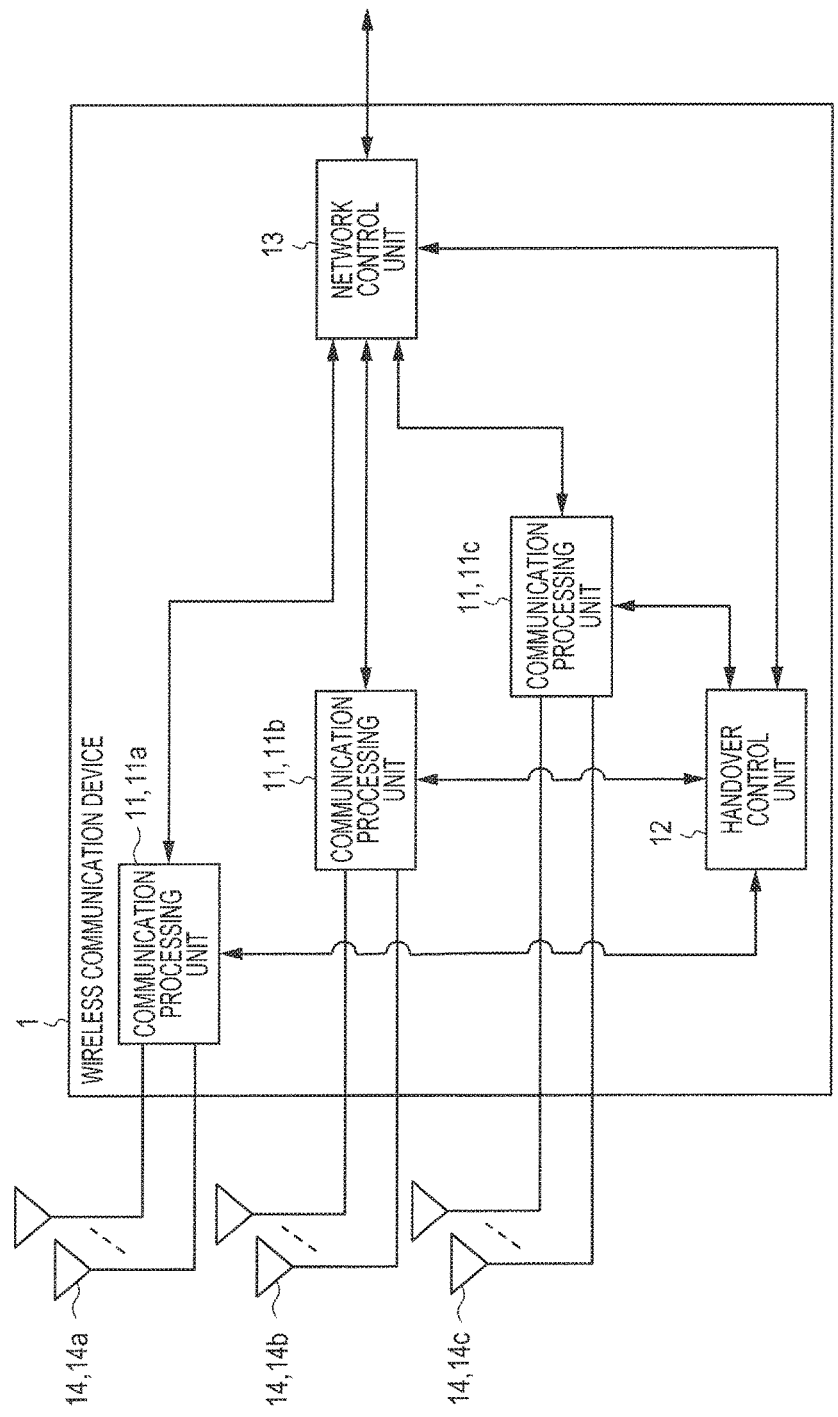
FIG. 2 is a block diagram illustrating an example of the configuration of a wireless communication device according to Embodiment 1 of the present disclosure.
Figure 3:
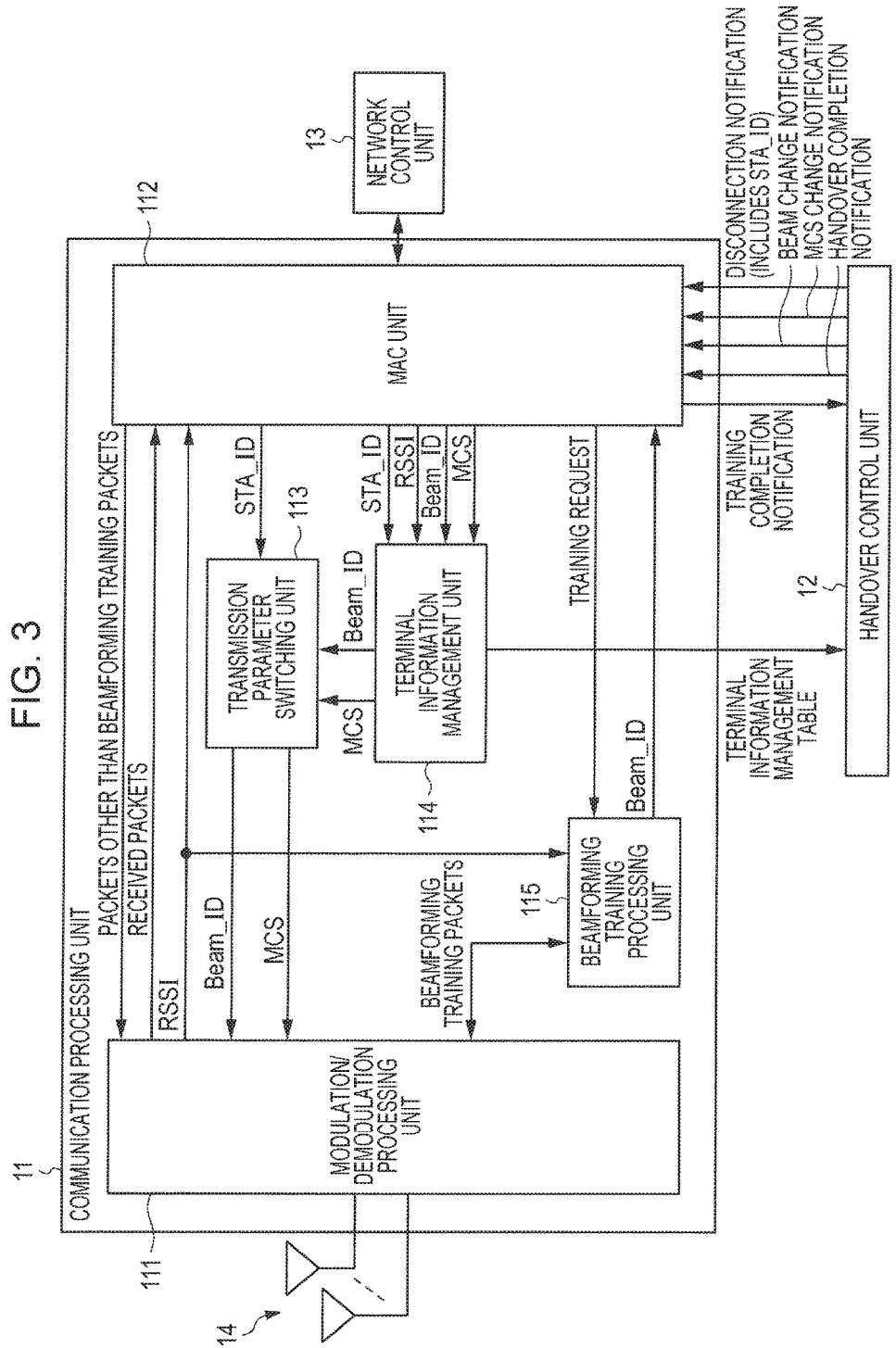
FIG. 3 is a block diagram illustrating an example of the configuration of a communication processing unit according to Embodiment 1 of the present disclosure.

Next, a configuration of the wireless communication device 1 will be described with reference to FIGS. 2 and 3. FIG. 2 is a block diagram illustrating an example of the configuration of the wireless communication device 1 according to the present embodiment. FIG. 3 is a block diagram illustrating an example of the configuration of a communication processing unit 11 according to the present embodiment.

In FIG. 2, the wireless communication device 1 includes communication processing units 11 (11a to 11c), a handover control unit 12, and a network control unit 13. Additionally, the wireless communication device 1 includes array antennas 14 (14a to 14c) connected to the communication processing units 11a to 11c, respectively.

The communication processing units 11a to 11c have the same configuration. On the other hand, the communication processing units 11a to 11c have mutually different MAC addresses. Hereinafter, the communication processing units 11a to 11c having the same configuration will be described as the communication processing unit 11.

As illustrated in FIG. 3, the communication processing unit 11 includes a modulation/demodulation processing unit 111, a MAC unit 112, a transmission parameter switching unit 113, a terminal information management unit 114, and a beamforming training processing unit 115.

The modulation/demodulation processing unit 111 performs modulation processing on packets acquired from the MAC unit 112 (specifically, packets other than training packets used for beamforming). Additionally, the modulation/demodulation processing unit 111 performs modulation processing on packets acquired from the beamforming training processing unit 115 (specifically, training packets used for beamforming). To conduct modulation processing, the modulation/demodulation processing unit 111 uses modulation and coding scheme (MCS) information acquired from the transmission parameter switching unit 113.

In addition, the modulation/demodulation processing unit 111 receives an indication of a beam ID (Beam_ID) from the transmission parameter switching unit 113, and controls the array antenna 14 to form a beam pattern corresponding to the beam ID. The modulation/demodulation processing unit 111 uses the formed beam pattern to transmit packets that have been subjected to modulation processing. The beam ID is identification information assigned to each of multiple beam patterns formed by controlling the array antenna 14. Note that the beam patterns will be discussed later.

The modulation/demodulation processing unit 111 demodulates a signal received by the array antenna 14, and outputs to the MAC unit 112 the demodulated signal (packet) and reception quality information about the received signal (specifically, the received signal strength indication (RSSI)).

The MAC unit 112 attaches a MAC header to data acquired from the network control unit 13 to generate a packet, and outputs the generated packet to the modulation/demodulation processing unit 111.

The MAC unit 112 analyzes the MAC header attached to the packet (received packet) acquired from the modulation/demodulation processing unit 111.

If the analysis result is that the packet acquired from the modulation/demodulation processing unit 111 is a data packet, the MAC unit 112 outputs the data packet to the network control unit 13.

If the analysis result is that the packet acquired from the modulation/demodulation processing unit 111 is a control packet, the MAC unit 112 conducts a process according to the control packet. If necessary, the MAC unit 112 generates and outputs to the modulation/demodulation processing unit 111 a response control packet for responding.

If the analysis result is that the packet acquired from the modulation/demodulation processing unit 111 is a training packet used for beamforming, the MAC unit 112 does not conduct the above processes. The training packet used for beamforming is processed by the beamforming training processing unit 115 discussed later.

The MAC unit 112 outputs an ID (STA_ID) that acts as identification information of a wireless terminal to the transmission parameter switching unit 113. To transmit packets output to the modulation/demodulation processing unit 111, the MAC unit 112 changes the beam direction and the MCS for each wireless terminal (STA) to transmit to.

The MAC unit 112 outputs the STA_ID of a connected wireless terminal, the RSSI, the beam ID, and the MCS to the terminal information management unit 114.

Specifically, the MAC unit 112 outputs the RSSI of the most recently received packet from the wireless terminal indicated by the STA_ID. For example, after carrying out beamforming training, the MAC unit 112 outputs the RSSI of the last packet received in the series of beamforming training (a training packet used for beamforming). If a data packet is received after carrying out beamforming training, the MAC unit 112 outputs the RSSI of the received data packet. In other words, the beam ID output by the MAC unit 112 is decided by the beamforming training that is carried out. Beamforming training will be discussed in detail later.

The information output to the terminal information management unit 114 may be all or some of the STA_ID, the RSSI, the beam ID, and the MCS. Specifically, if the RSSI is updated, the MAC unit 112 outputs the STA_ID and the RSSI.

The MAC unit 112 outputs a training request to the beamforming training processing unit 115. The training request includes the STA_ID indicating the wireless terminal on which beamforming training is to be carried out. The timing at which to output a training request may be periodic, when the reception quality drops, when the throughput drops, or a combination of these. After outputting a training request, the MAC unit 112 acquires from the beamforming training processing unit 115 a beam ID decided by the beamforming training that is carried out. After beamforming training is completed, the MAC unit 112 outputs a training completion notification to the handover control unit 12.

If the MAC unit 112 acquires a disconnection notification from the handover control unit 12, the MAC unit 112 generates and outputs to the modulation/demodulation processing unit 111 a packet for notifying the specified wireless terminal of the disconnection.

If the MAC unit 112 acquires an MCS change notification from the handover control unit 12, the MAC unit 112 outputs the specified STA_ID (or an ID used for broadcasting) and the MCS to the terminal information management unit 114.

If the MAC unit 112 acquires a beam change notification from the handover control unit 12, the MAC unit 112 outputs the specified STA_ID (or an ID used for broadcasting) and the beam ID to the terminal information management unit 114. The beam ID output by the MAC unit 112 to the terminal information management unit 114 is a beam ID held in advance and used in a beacon to transmit as part of the process of handover control (handover beam ID).

If the MAC unit 112 acquires a handover completion notification from the handover control unit 12, the MAC unit 112 outputs the STA_ID and the beam ID to the terminal information management unit 114, to revert the beam ID of the STA_ID (or the ID used for broadcasting) to the beam ID used for the transmission of an ordinary beacon (ordinary beam ID). Note that the ordinary beam ID may be a quasi-omnidirectional beam pattern (beam ID), or a specific beam pattern (for example, Beam #3 in FIG. 5 discussed later).

The MAC unit 112 manages scheduling, including the beacon transmission timings, the timings at which to carry out beamforming training, and the assignment of transmission periods to wireless terminals.

The transmission parameter switching unit 113 uses the STA_ID acquired from the MAC unit 112 to acquire the beam ID and MCS corresponding to that STA_ID from the terminal information management unit 114, and outputs the acquired beam ID and MCS to the modulation/demodulation processing unit 111.

The terminal information management unit 114 registers the STA_ID, the RSSI, the beam ID, and the MCS acquired from the MAC unit 112 in a terminal information management table.

Figures 4, 5:
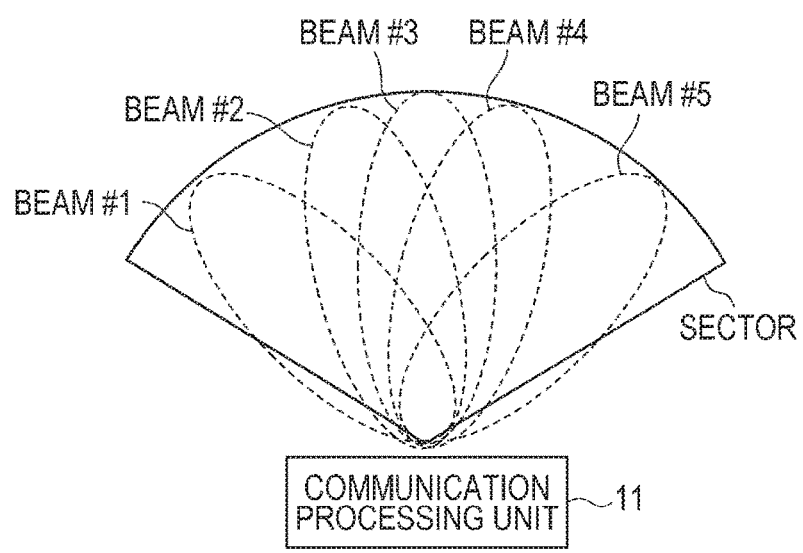
FIG. 4 is a diagram illustrating an example of a terminal information management table managed by a terminal information management unit.
FIG. 5 is a diagram illustrating an example of a beam pattern formed by a communication processing unit.

FIG. 4 is a diagram illustrating an example of the terminal information management table managed by the terminal information management unit 114. In the terminal information management table of FIG. 4, "STA1" is the STA_ID of one wireless terminal, and information related to the wireless terminal indicated by "STA1" is indicated in association with "STA1". Also, "ALL" is information for transmitting packets by broadcast.

In STA_ID, the terminal information management unit 114 may register the MAC address of a wireless terminal or an ID linked to the MAC address, or register both the STA_ID and the MAC address of the wireless terminal. Since "ALL" is information related to packets to be transmitted by broadcast, wireless quality information (RSSI) with a specific wireless terminal is not received. For this reason, an RSSI corresponding to "ALL" is not registered. The information registered with respect to "ALL" is the beam ID and the MCS. Note that when switching beams according to an instruction from the handover control unit 12, the terminal information management unit 114 overwrites the beam ID for "ALL" with a default value held by the MAC unit 112.

The beamforming training processing unit 115, when triggered by a training request from the MAC unit 112, conducts beamforming training prescribed by IEEE 802.11ad, namely a sector level sweep (SLS), with the wireless terminal specified by the training request, and decides the beam pattern to use for connecting to the wireless terminal.

The beamforming training processing unit 115, when triggered by a training request from the MAC unit 112, generates and outputs to the modulation/demodulation processing unit 111 a beamforming training packet for conducting an SLS. If a received packet acquired from the modulation/demodulation processing unit 111 is a beamforming training packet, the beamforming training processing unit 115 conducts a process corresponding to an SLS. The beamforming training processing unit 115 outputs to the MAC unit 112 a beam ID corresponding to the beam pattern decided by the SLS.

The handover control unit 12, when triggered by a training completion notification acquired from each communication processing unit 11 (11a to 11c), starts a handover control based on the terminal information management table acquired from the terminal information management unit 114 of the communication processing unit 11 (specifically, at least one of the communication processing units 11a to 11c) that issued the training completion notification. A specific method of handover control will be discussed later.

The handover control unit 12 manages a handover history. Specifically, the handover history includes information such as the number of times handover has been conducted, and which communication processing unit 11 from among the communication processing units 11a to 11c was connected. When handover is completed, the handover control unit 12 outputs a handover completion notification to the MAC unit 112 of the communication processing unit 11 (specifically, at least one of the communication processing units 11a to 11c) that was connected before the handover control.

The network control unit 13 outputs data acquired via the communication processing unit 11 to the communication network 10. Additionally, the network control unit 13 outputs data from the communication network 10 to the communication processing unit 11 (specifically, at least one of the communication processing units 11a to 11c) managing the wireless terminal to which the data is to be transmitted. Additionally, the network control unit 13 has a function of measuring the amount of data packets transmitted and received by the communication processing unit 11, or in other words, the amount of traffic, and notifies the handover control unit 12 of the measured amount of traffic.

<Beam Patterns>

Next, beam patterns formed by the communication processing unit 11 will be described with reference to FIG. 5. FIG. 5 is a diagram illustrating an example of a beam pattern formed by the communication processing unit 11. Note that in FIG. 5, the array antenna 14 that transmits a signal is omitted from illustration.

In FIG. 5, the communication processing unit 11 uses the array antenna 14 to switch the beam pattern to form from among five beam patterns. Herein, a beam refers to a range (communication area) in which wireless signals may be transmitted and received. For example, the communication processing unit 11 forms a beam by controlling the phase, the amplitude, or both the phase and the amplitude of signals transmitted by each antenna element of the array antenna 14. The five beam patterns are beam patterns with high directionality (narrow directionality), going in respectively different beam directions.

In FIG. 5, for example, the communication processing unit 11 switches among five beam patterns to form a communication area of approximately 120 degrees.

<Beamforming Training>

Next, beamforming training will be described.

The communication processing unit 11 conducts beamforming training in accordance with the SLS of the IEEE 802.11ad protocol, for example. In other words, first, the communication processing unit 11 switches the beam pattern, and with each beam pattern, transmits and receives beamforming training packets to and from the wireless terminal. The communication processing unit 11 feeds back beam patterns with the best reception quality into each other, and decides the beam pattern to use for communication with the wireless terminal.

The timing at which to execute beamforming training may be periodic, when triggered by degradation of the communication quality, when triggered by lowered throughput, or a combination of the three.

<Communication Area of Wireless Communication Device>

Figure 6:
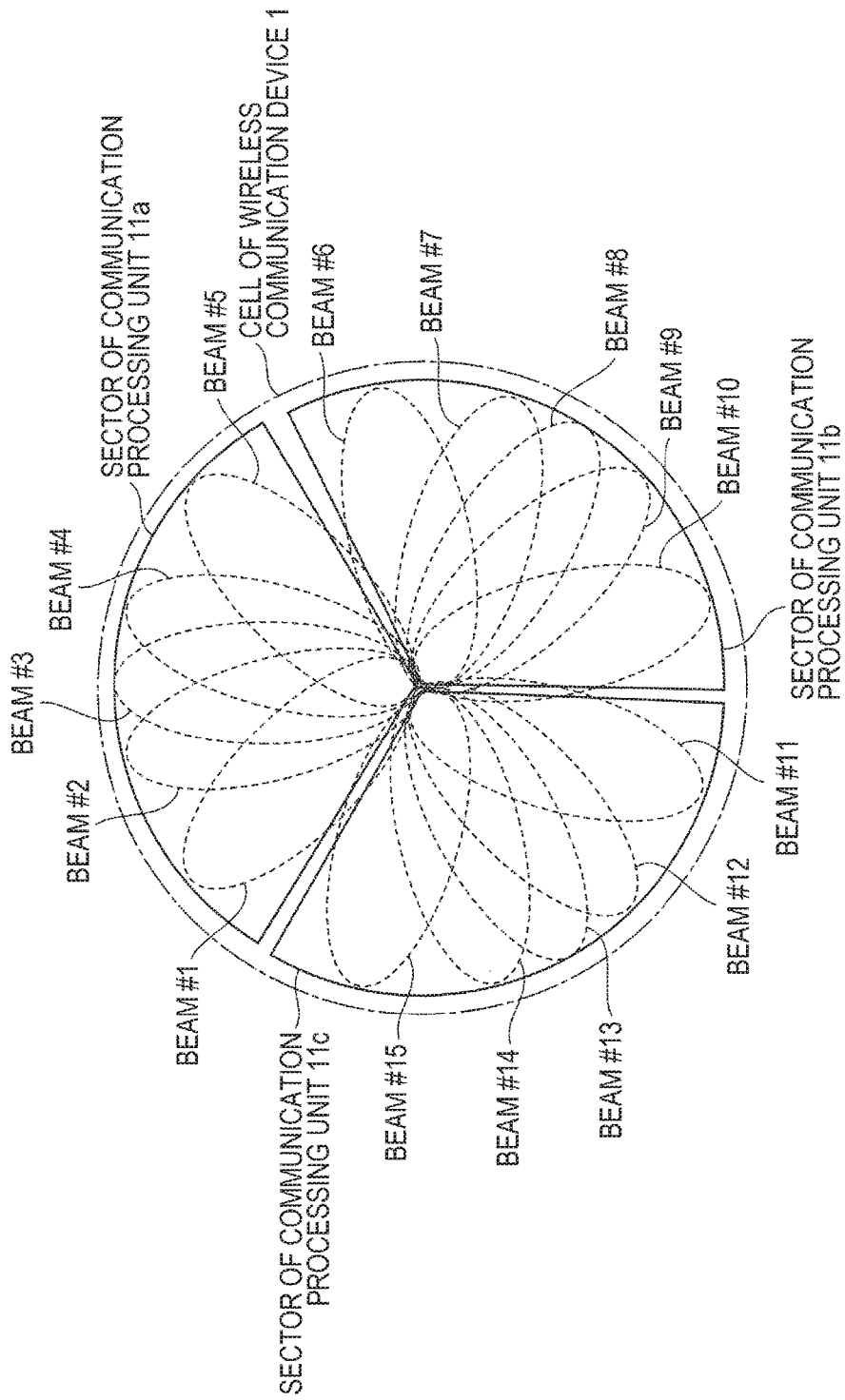
FIG. 6 is a diagram illustrating an example of a communication area formed by a wireless communication device.

Next, the communication area of the wireless communication device 1 will be described with reference to FIG. 6. FIG. 6 is a diagram illustrating an example of a communication area formed by the wireless communication device 1. Note that, although not illustrated, the wireless communication device 1 is positioned in the approximate center of the cell of the wireless communication device 1.

First, some terms used in the present embodiment will be explained.

A beam is one beam pattern held by the communication processing unit 11 (as discussed earlier, a range (communication area) over which wireless signals may be transmitted and received).

A sector is a range (communication area) over which transmission and reception is possible, which the communication processing unit 11 is able to cover by switching beams (beam patterns).

A cell is a range (communication area) over which transmission and reception is possible, which may be covered by combining multiple sectors.

Each of Beam #1 to Beam #15 is assigned a respective beam ID. In the following description, the beam ID of Beam #1 is #1. The beam (or beam pattern) corresponding to the beam ID of #1 is called Beam #1.

In other words, in FIG. 6, the communication processing unit 11a has five beams from Beam #1 to Beam #5, and by switching among Beam #1 to Beam #5, covers the sector of the communication processing unit 11a. The cell of the wireless communication device 1 is formed by combining the sectors of the communication processing units 11a to 11c. The sectors are adjacent to each other at the boundaries between sectors.

In FIG. 6, the communication area (cell) of the wireless communication device 1 covers the full perimeter of the wireless communication device 1 by combining the three sectors of the communication processing units 11a to 11c so that the sectors do not overlap each other.

In FIG. 6, Beam #1 and Beam #5 are the beams at the edges of the sector of the communication processing unit 11a. Similarly, Beam #6 and Beam #10 are the beams at either end of the sector of the communication processing unit 11b, and Beam #11 and Beam #15 are the beams at either end of the sector of the communication processing unit 11c.

In the sector of the communication processing unit 11a, the sector adjacent to Beam #1 is the sector of the communication processing unit 11c, while the sector adjacent to Beam #5 is the sector of the communication processing unit 11b. Similarly, in the sector of the communication processing unit 11b, the sector adjacent to Beam #6 is the sector of the communication processing unit 11a, while the sector adjacent to Beam #10 is the sector of the communication processing unit 11c. Similarly, in the sector of the communication processing unit 11c, the sector adjacent to Beam #11 is the sector of the communication processing unit 11b, while the sector adjacent to Beam #15 is the sector of the communication processing unit 11a.

The handover control unit 12 is able to select a candidate of the communication processing unit 11 to connect to after handover control, based on whether or not the beam that the communication processing unit 11 uses to connect to the wireless terminal is a beam on either end of a sector, and in the case of a beam on either end, which sector the beam is adjacent to.

The handover control unit 12 hands over to the beam on either end of the communication processing unit 11 in the adjacent sector selected by handover control. After handover control, the handover control unit 12 instructs the communication processing unit 11 that had been connected before the handover control to change from the beam on either end to another beam. According to this control, after the handover control, the wireless terminal is restrained from making a request for handover control back to the communication processing unit 11 that had been connected before the handover control, and thus handover control may be conducted efficiently.

For example, in FIG. 6, if the communication processing unit that had been connected before the handover control is the communication processing unit 11a, and if the beam that the communication processing unit 11a uses to connect to the wireless terminal is Beam #5, the handover control unit 12 is able to select the communication processing unit 11b covering the sector adjacent to Beam #5 as the communication processing unit to connect to after the handover control.

Next, the handover control unit 12 changes the beam of the selected communication processing unit 11b to Beam #6, which is adjacent to Beam #5 of the communication processing unit 11a.

Next, the handover control unit 12 changes the beam of the communication processing unit 11a from Beam #5 at one end to another beam, such as Beam #3, for example. Thus, it is possible to conduct handover efficiently, and in addition, inhibit another handover request by the wireless terminal.

<Handover Control of Wireless Communication Device>

Figure 7:
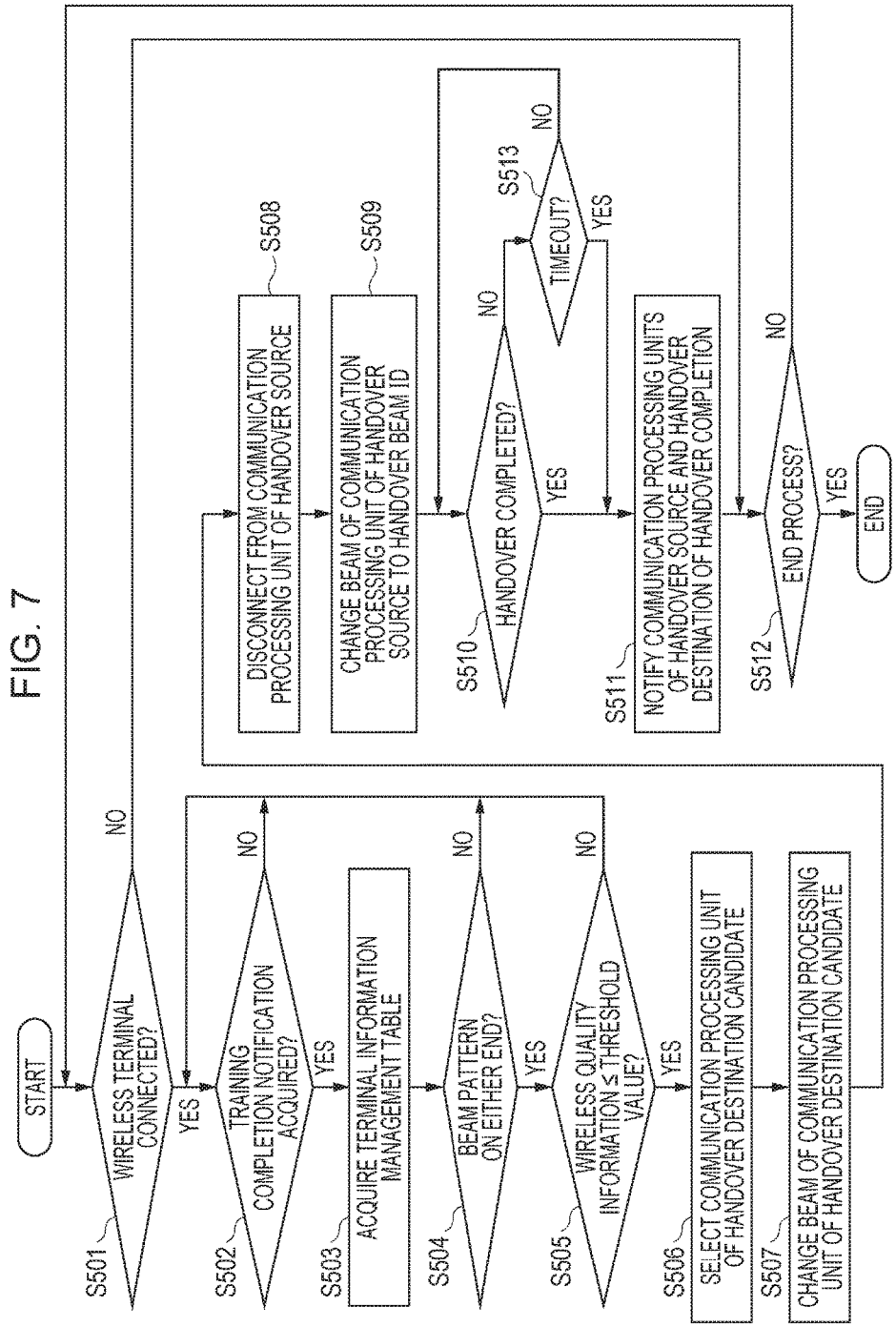
FIG. 7 is a flowchart illustrating an example of handover control of a wireless communication device according to Embodiment 1 of the present disclosure.

Next, the handover control of the wireless communication device 1 will be described with reference to FIG. 7. FIG. 7 is a flowchart illustrating an example of the handover control of the wireless communication device 1 according to the present embodiment.

In step S501, the communication processing unit 11 determines whether or not there is a connection with the wireless terminal. If the communication processing unit 11 is connected to the wireless terminal (S501: Yes), the handover control proceeds to step S502. Meanwhile, if the communication processing unit 11 is not connected to the wireless terminal (S501: No), the handover control proceeds to step S512.

If the communication processing unit 11 is connected to the wireless terminal, the communication processing unit 11 conducts beamforming training periodically, for example.

In step S502, the handover control unit 12 determines whether or not a training completion notification has been acquired. If the handover control unit 12 has acquired a training completion notification (S502: Yes), the handover control proceeds to step S503. If the handover control unit 12 has not acquired a training completion notification (S502: No), the handover control returns to step S502.

In step S503, the handover control unit 12 acquires a terminal information management table from the terminal information management unit 114 of the communication processing unit 11 that issued the training completion notification. Subsequently, the handover control proceeds to step S504.

In step S504, the handover control unit 12 searches the acquired terminal information management table for the STA_ID included in the training completion notification, and determines whether or not the beam pattern indicated by the beam ID of the STA_ID found by the search is a beam on either end of the sector.

At this point, in FIG. 6, the beam pattern in which the beam is on either end of the sector is Beam #1 or Beam #5 when the wireless terminal is connected to the communication processing unit 11a, Beam #6 or Beam #10 when connected to the communication processing unit 11b, and Beam #11 or Beam #15 when connected to the communication processing unit 11c.

If the result of the determination by the handover control unit 12 is that the beam pattern is a beam on either end of the sector (S504: Yes), the handover control proceeds to step S505. On the other hand, if the beam pattern is not a beam on either end (S504: No), the handover control returns to step S502.

In step S505, the handover control unit 12 searches the acquired terminal information management table for the STA_ID included in the training completion notification, and determines whether or not the wireless quality information (RSSI) of the STA_ID found by the search is less than or equal to a certain threshold value. If the wireless quality information is less than or equal to the threshold value (S505: Yes), the handover control proceeds to step S506. On the other hand, if the wireless quality information is greater than the threshold value (S505: No), the handover control returns to step S502.

According to the process in step S502 discussed above, since beamforming training has been completed, in S505, the wireless terminal communicates by using the beam pattern with the best communication quality in the sector covered by the currently connected communication processing unit 11. In other words, in step S505, the case in which the wireless quality information is less than or equal to the threshold value (S505: Yes) means that the communication quality of communication using the beam pattern with the best reception quality in the sector covered by the currently connected communication processing unit 11 is less than or equal to the threshold value, or in other words, a handover from the currently connected communication processing unit 11 to another communication processing unit 11 is required. For this reason, in the processes of step S506 and thereafter, a handover is executed according to control by the handover control unit 12.

In step S506, The handover control unit 12 selects the communication processing unit 11 to serve as a candidate for connection after the handover control (handover destination candidate).

Next, the selection method will be described for the case in which the communication processing unit 11 that the communication processing unit 11 is connected to before the handover control (handover source) is the communication processing unit 11a. If the communication processing unit 11a is using Beam #5 to connect to the wireless terminal, the handover control unit 12 selects the communication processing unit 11b covering the sector adjacent to Beam #5 as the handover destination candidate. Also, if the communication processing unit 11a is using Beam #1 to connect to the wireless terminal, the handover control unit 12 selects the communication processing unit 11c covering the sector adjacent to Beam #1 as the handover destination candidate.

In step S507, the handover control unit 12 controls the changing of the beam by issuing a beam change notification to the MAC unit 112 of the communication processing unit 11 acting as the handover destination candidate. Subsequently, the handover control proceeds to step S508.

In other words, in the case in which the handover destination candidate is the communication processing unit 11b, the handover control unit 12 notifies the communication processing unit 11b to configure Beam #6. Also, in the case in which the handover destination candidate is the communication processing unit 11c, the handover control unit 12 notifies the communication processing unit 11c to configure Beam #15.

In step S508, the handover control unit 12 issues a disconnection notification to the MAC unit 112 of the communication processing unit 11 acting as the handover source, in order to disconnect the connected wireless terminal. After issuing the disconnection notification, the handover control unit 12 activates a timer. The MAC unit 112 of the communication processing unit 11 acting as the handover source disconnects the connected wireless terminal according to the disconnection notification from the handover control unit 12. Subsequently, the handover control proceeds to step S509.

In step S509, the handover control unit 12 notifies the MAC unit 112 of the communication processing unit 11 acting as the handover source to change the beam pattern to a beam ID used for handover. The MAC unit 112 of the communication processing unit 11 acting as the handover source causes the terminal information management unit 114 of the communication processing unit 11 acting as the handover source to change the beam ID of the STA_ID used for broadcasting to the beam ID used for handover. The beam ID used for handover is set to prevent the wireless terminal conducting handover from reconnecting to the communication processing unit 11 acting as the handover source. For example, in the case of the communication processing unit 11a, the beam ID used for handover may be Beam #3, which covers the communication area in the center of the sector, or alternatively, Beam #1 or #2, which are distanced from the handover destination. Subsequently, the handover control proceeds to step S510.

In step S510, the handover control unit 12 determines whether or not the wireless terminal has connected to the communication processing unit 11 acting as the handover destination candidate, and handover has been completed. As a method of judging whether or not handover has been completed, a judgment may be made according to whether or not a training completion notification for the handed-over wireless terminal has been received from the communication processing unit 11 acting as the handover destination.

If the handover control unit 12 determines that handover has been completed (S510: Yes), the handover control proceeds to step S511. Otherwise, if the handover control unit 12 determines that handover has not been completed (S510: No), the handover control proceeds to step S513.

In step S511, the handover control unit 12 notifies the MAC unit 112 of the communication processing units 11 acting as the handover source and the handover destination of handover completion. The MAC unit 112 of the communication processing unit 11 acting as the handover source and the handover destination notifies the terminal information management unit 114 to change the beam ID of the STA_ID used for broadcasting to a normal beam ID. Subsequently, the handover control proceeds to step S512.

In step S513, the communication processing unit 11 activates a timer after issuing a disconnection notification to the MAC unit 112 of the communication processing unit 11 acting as the handover source, and determines whether or not the activated timer has finished (in other words, whether or not a timeout has occurred). If the handover control unit 12 determines that the timer has finished (S513: Yes), the handover control proceeds to step S511. Otherwise, if the handover control unit 12 determines that the timer has not finished (S513: No), the handover control proceeds to step S510.

Subsequently, in step S512, the handover control unit 12 determines whether or not an instruction to end the process has been given by a user operation or the like. If the handover control unit 12 has not been instructed to end the process (S512: No), the handover control proceeds to step S501. On the other hand, if the handover control unit 12 has been instructed to end the process (S512: Yes), the handover control ends.

<Connection Control by Wireless Terminal>

Figure 8:
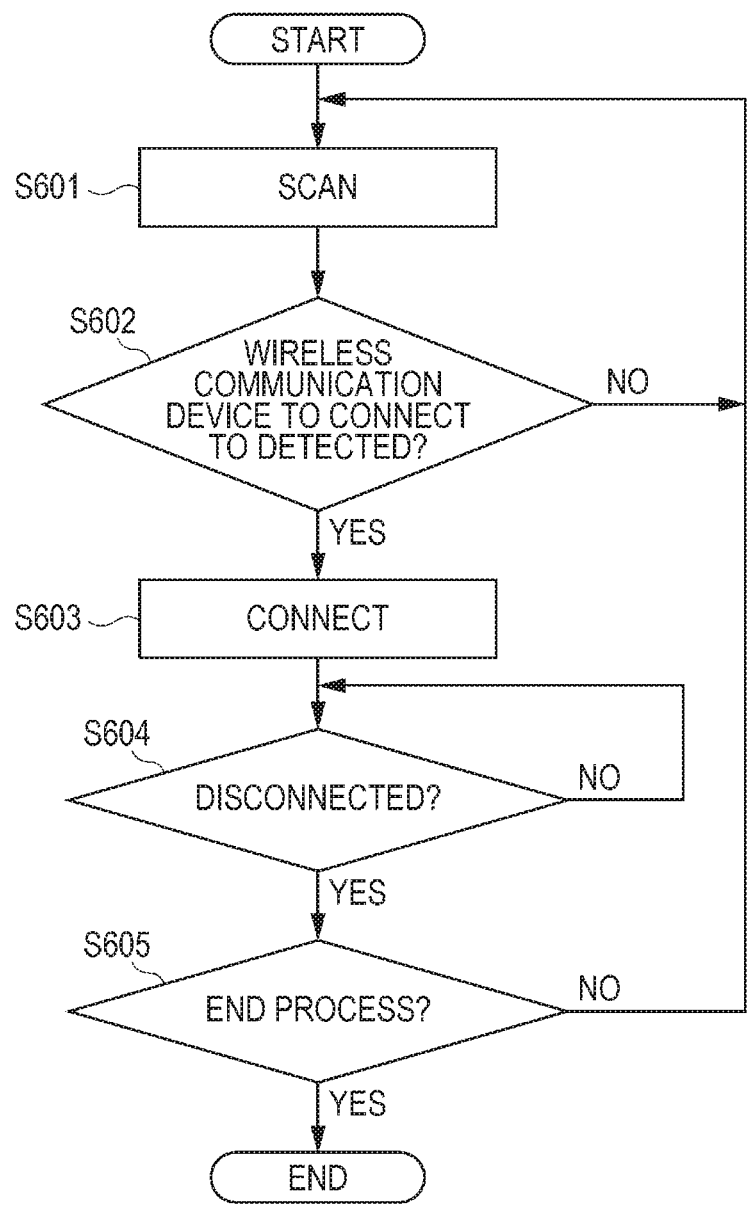
FIG. 8 is a flowchart illustrating an example of connection control by a wireless terminal.

Next, connection control by the wireless terminal will be described with reference to FIG. 8. FIG. 8 is a flowchart illustrating an example of connection control by the wireless terminal 2.

In step S601, the wireless terminal 2 performs a scan for searching for a wireless communication device 1 to connect to, or in other words, the communication processing unit 11.

In step S602, if the wireless terminal 2 detects the communication processing unit 11 to connect to, based on the scan result (S602: Yes), the connection control proceeds to step S603. Otherwise, if the wireless terminal 2 does not detect the communication processing unit 11 to connect to, based on the scan result (S602: No), the connection control returns to step S601.

In step S603, the wireless terminal 2 conducts connection control with the detected communication processing unit 11.

Note that if multiple communication processing units 11 are detected as a result of the scan, the wireless terminal 2 selects the communication processing unit 11 with the best reception quality as the communication processing unit 11 to connect to, and conducts connection control with the selected communication processing unit 11.

In step S604, the wireless terminal 2 monitors whether the connection relationship with the communication processing unit 11 is ongoing, and thereby determines whether or not a disconnection has occurred. If the wireless terminal 2 is disconnected from the communication processing unit 11 (S604: Yes), the connection control proceeds to step S605. Otherwise, if the connection between the wireless terminal 2 and the communication processing unit 11 is ongoing (S604: No), the connection control remains at step S604.

In step S605, the wireless terminal 2 determines whether or not an instruction to end the process has been given by a user operation or the like. If the wireless terminal 2 has not been instructed to end the process (S605: No), the connection control returns to step S601. Otherwise, if the wireless terminal 2 has been instructed to end the process (S605: Yes), the connection control ends.

In FIG. 7, when the handover control is executed, the communication processing unit 11 acting as the handover destination candidate has already formed a beam adjacent to the beam provided by the communication processing unit 11 acting as the handover source. For this reason, in the scan for handover, the wireless terminal 2 is able to detect the communication processing unit 11 acting as the handover destination candidate easily.

Note that although a case in which one wireless terminal 2 is connected to the communication processing unit 11 is described as an example in Embodiment 1, the operation is the same even if two or more wireless terminals 2 are connected. Since the wireless system anticipated by the present embodiment is half-duplex communication and also implements carrier sense multiple access with collision avoidance (CSMA/CA), multiple wireless terminals 2 connected to a single communication processing unit 11 do not transmit, receive, or transmit and receive at the same time, and furthermore, the beam used by the wireless terminal 2 is also predetermined, and the time (period) of transmitting a beacon is differentiated from the time (period) of data communication with the wireless terminal 2. Consequently, the present embodiment is effective even in cases in which multiple wireless terminals 2 exist.

Figure 9:
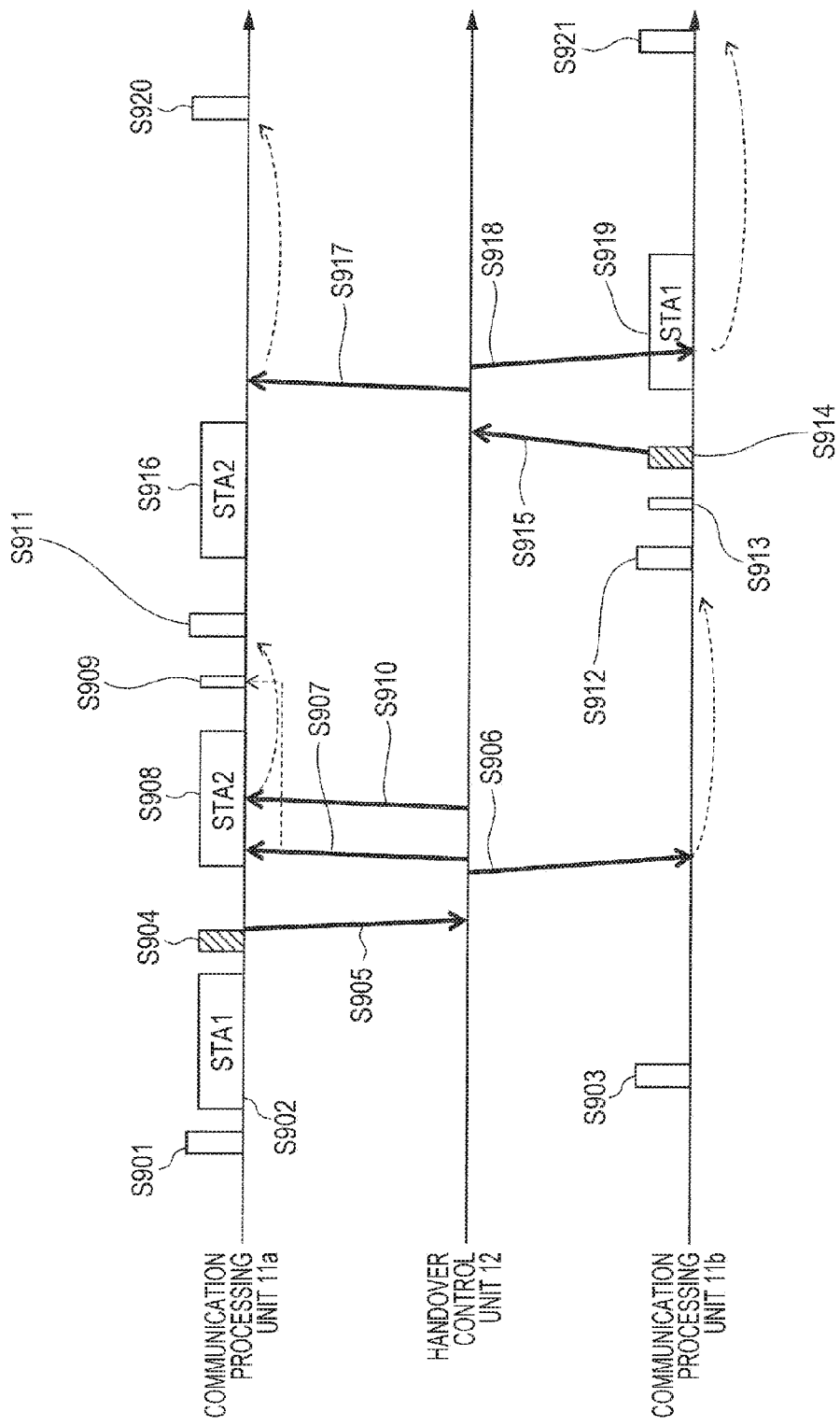
FIG. 9 is a diagram illustrating operations when two wireless terminals are connected to a communication processing unit.

FIG. 9 illustrates a time sequence of operations by the communication processing units 11a and 11b as well as the handover control unit 12 in a case in which the communication processing unit 11a is connected to two wireless terminals (STA1, STA2). For the beams used during communication, the operation of the communication processing units 11a and 11b as well as the beam ID are indicated.

The communication processing units 11a and 11b periodically transmit a beacon. To differentiate the beacons, the beacons are denoted by separate names for the sake of convenience, but Beacon #11, Beacon #12, and Beacon #13 are the same beacon, and additionally, Beacon #21, Beacon #22, and Beacon #23 are the same beacon.

In FIG. 9, the communication processing unit 11a allocates a communication period with STA1 after the transmission of Beacon #11 (S901). Although not illustrated in FIG. 9, before Beacon #11, the beamforming training processing unit 115 of the communication processing unit 11a executes an SLS, and selects Beam #5. The communication processing unit 11a communicates with STA1 using Beam #5 (S902).

Additionally, the communication processing unit 11b not connected to a wireless terminal transmits Beacon #21 using Beam #8 (S903).

After the communication period with STA1 ends, the communication processing unit 11a executes a preset SLS with respect to STA1 (S904). Subsequently, the communication processing unit 11a issues a training completion notification to the handover control unit 12 (S905).

The handover control unit 12 acquires the terminal information management table from the terminal information management unit 114 of the communication processing unit 11a, determines the target of handover from the beam ID and RSSI of STA1, and selects the communication processing unit 11b as the handover destination candidate.

The handover control unit 12 notifies the communication processing unit 11b of an update to the terminal information management table (S906). Following the update notification, the communication processing unit 11b overwrites the beam ID for transmitting Beacon #22 with a beam ID different from the already-transmitted Beacon #21 (in the case of FIG. 9, from #8 to #6).

Although not illustrated in FIG. 9, if communication occurs during the period between updating the terminal information management table (S906) and transmitting Beacon #22 (S912), the communication processing unit 11b uses a beam that is different from the beam to use for the transmission of Beacon #22 as the beam to use for the communication that occurs. In other words, in the communication processing unit 11b, communication that occurs in the period between updating the terminal information management table and Beacon #22 is unaffected by the update to the terminal information management table.

The handover control unit 12, after updating the terminal information management table included in the terminal information management unit 114 of the communication processing unit 11b, notifies the communication processing unit 11a to disconnect from STA1 (S907). In FIG. 9, at the timing of issuing the disconnection notification, the communication processing unit 11a is communicating with STA2 (S908). For this reason, the communication processing unit 11a transmits a disconnect frame after the communication period with STA2 ends (S909).

In addition, the handover control unit 12 notifies the communication processing unit 11b of an update to the terminal information management table (S910). The communication processing unit 11a switches the beam ID from #5 to #3 based on the updated terminal information management table, and then transmits Beacon #12 (S911). Consequently, the communication processing unit 11a is able to keep STA1 from being reconnected.

STA1 executes a scan process after disconnecting from the communication processing unit 11a, and searches for a communication processing unit 11 to act as a handover destination. STA1 receives Beacon #22 transmitted by the communication processing unit 11b using Beam #6 (S912). STA1 issues a connection request to the communication processing unit 11b. The communication processing unit 11b receives the connection request from STA1 (S913), and completes the connection process with STA1. After the connection process is completed, the communication processing unit 11b conducts an SLS with respect to STA1, and decides an optimal beam (S914). The communication processing unit 11b notifies the handover control unit 12 that handover control has been completed (S915).

Note that in FIG. 9, while the communication processing unit 11b is conducting the connection process with STA1, the communication processing unit 11a communicates with STA2 using Beam #5 (S916). At this point, for STA2, the wireless quality information (for example, the RSSI) of Beam #5 exceeds a threshold value and thus does not become a target of handover, and STA2 is able to maintain the connection with the communication processing unit 11a.

The handover control unit 12 updates the terminal information management tables managed by the communication processing units 11a and 11b, respectively, based on the handover completion notification from the communication processing unit 11b (S917, S918). In other words, in FIG. 9, Beacon #13 reverts from Beam #3 used for the transmission of Beacon #12 to Beam #5 used for the transmission of Beacon #11, and Beacon #23 reverts from Beam #6 used for the transmission of Beacon #22 to Beam #8 used for the transmission of Beacon #21.

Note that in FIG. 9, while the communication processing unit 11b is acquiring the notification of an update to the terminal information management table, the communication processing unit 11b communicates with STA1 using Beam #6 (S919).

According to the update of the terminal information management table in step S917, the communication processing unit 11a changes the beam ID from #3 to #5, and transmits Beacon #13 (S920). Additionally, according to the update of the terminal information management table in step S918, the communication processing unit 11b changes the beam ID from #6 to #8, and transmits Beacon #23 (S921).

Note that the beam ID used for communication with STA2 after the communication processing unit 11a transmits Beacon #12 is not dependent on the transmission of Beacon #12, but instead uses the beam ID for STA2 registered in the terminal information management table. For this reason, the communication processing unit 11a is able to communicate without being affected by the series of handover controls.

Note that the communication processing unit 11a changes the beam ID in the transmission of Beacon #12. For this reason, there is a possibility that STA2 may have difficulty receiving Beacon #12. However, in the communication standard (for example, IEEE 802.11ad), the wireless terminal being unable to receive at least one or more beacons is tolerated, and it is acceptable for STA2 to be unable to receive Beacon #12.

Note that if the communication processing unit is connecting multiple wireless terminals, to simplify the process, an SLS may be executed for one wireless terminal in the period between beacon and beacon. For example, in FIG. 9, the communication processing unit 11a does not conduct an SLS for each of STA1 and STA2 between Beacon #11 and Beacon #12, but instead executes an SLS for STA1, and between Beacon #12 and Beacon #13, executes an SLS for STA2. Since the beacon interval on a wireless LAN is approximately 100 ms, for example, even if an SLS is executed for one wireless terminal in the period between beacon and beacon, beam tracking performance does not suffer significantly.

As described above, according to the present embodiment, in a wireless communication device 1 including multiple communication processing units 11 using millimeter wave communication in which each acts as an access point, the handover control unit 12 determines whether or not a beam that the communication processing unit 11 uses to communicate with a wireless terminal is a beam on either end of a sector, and in the case of a beam on either end of the sector, determines whether or not to conduct handover, based on whether or not the wireless quality information is less than or equal to a threshold value. In addition, in the case of a beam on either end of the sector, the handover control unit 12 selects the communication processing unit 11 that covers another sector adjacent to the beam on either end as the handover destination candidate. Furthermore, if the communication processing unit 11 the handover control unit 12 changes the beam of the communication processing unit 11 acting as the handover destination to a beam adjacent to the beam on either end of the sector in the handover source.

According to such a configuration, by bringing the beam of the communication processing unit 11 acting as the handover destination adjacent to the beam of the communication processing unit 11 acting as the handover source in advance, the wireless terminal is able to receive a beacon transmitted from the communication processing unit 11 acting as the handover destination, thereby minimizing reductions in communication efficiency, even for handover between communication processing units having directionality.

In addition, according to the present embodiment, after the connection with the wireless terminal is changed from to the communication processing unit 11 acting as the handover destination by handover control, the communication processing unit 11 acting as the handover source changes its beam to a direction farther away from the boundary with the sector of the communication processing unit 11 acting as the handover destination than the beam that had been used to connect with the wireless terminal. According to such a configuration, it is possible to keep the wireless terminal from reconnecting to the communication processing unit 11 acting as the handover source, and minimize frequent changes to the connection target (communication partner) of the wireless terminal.

Embodiment 2

Embodiment 1 describes a case in which a single wireless communication device including a handover control unit is connected to a communication network. Embodiment 2 describes a case in which multiple wireless communication devices including a handover control unit are connected to the same communication network.

Figure 10:
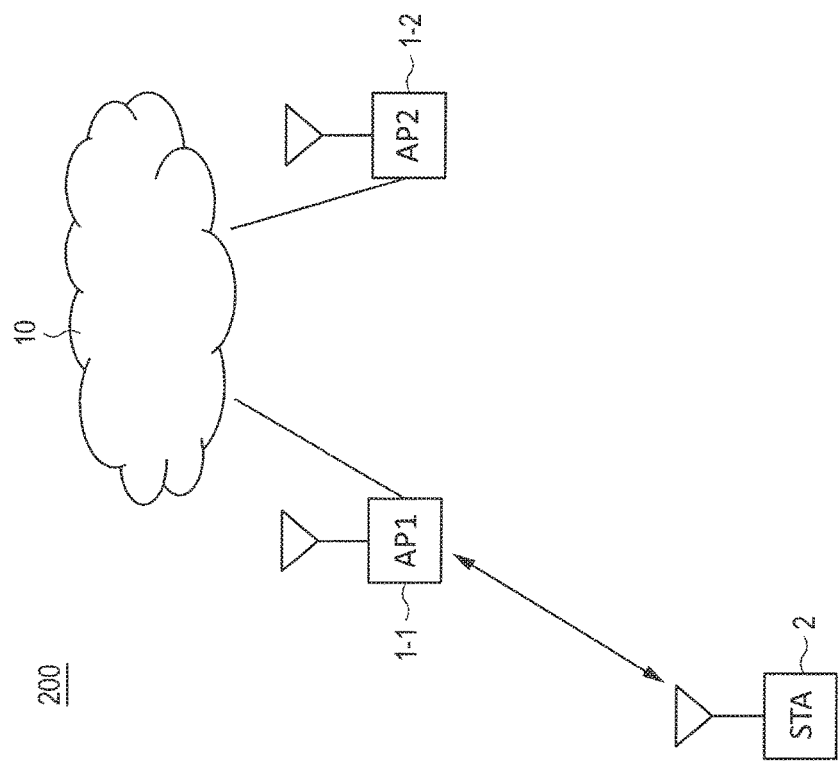
FIG. 10 is a system configuration diagram illustrating an example of the configuration of a communication system including a wireless communication device according to Embodiment 2 of the present disclosure.

FIG. 10 is a system configuration diagram illustrating an example of the configuration of a communication system 200 including wireless communication devices 1-1 and 1-2 according to the present embodiment. In FIG. 10, in the communication system 200, two wireless communication devices (AP1, AP2) 1-1 and 1-2 are connected to a communication network 10. Also, a wireless terminal (STA) 2 is connected to the wireless communication device (AP1) 1-1.

Since the configuration of the wireless communication devices 1-1 and 1-2 is similar to the configuration of the wireless communication device 1 illustrated in Embodiment 1, further description will be reduced or omitted. Also, Embodiment 2 primarily differs from Embodiment 1 in the method of selecting the handover destination candidate, and the method of selecting the handover control unit to conduct handover control. Hereinafter, each of these methods will be described.

<Selection of Handover Control Unit>

Figure 11:
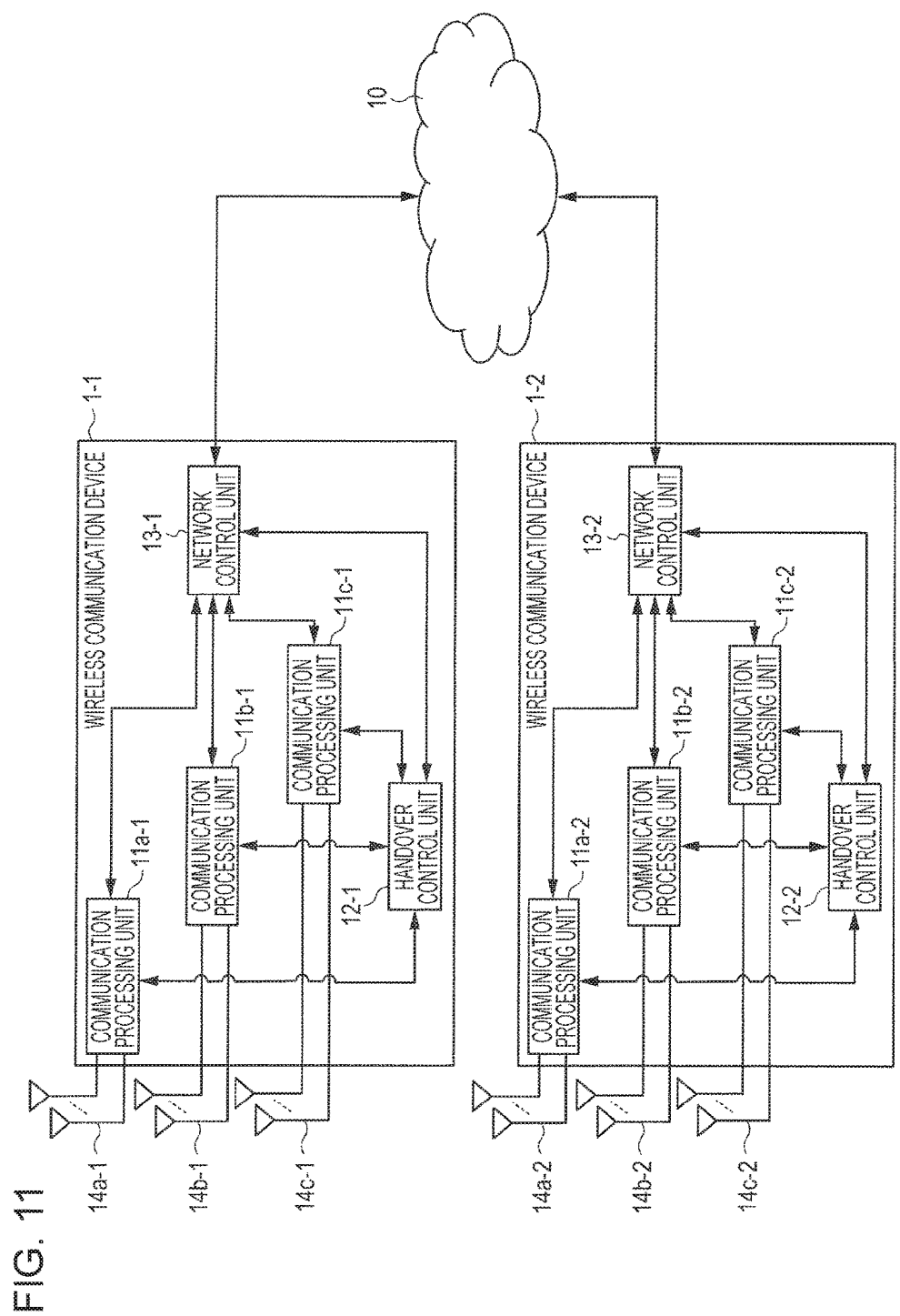
FIG. 11 is a diagram illustrating an example of the connection state of wireless communication devices according to Embodiment 2 of the present disclosure.

FIG. 11 is a diagram illustrating an example of the connection state of the wireless communication devices 1-1 and 1-2 according to the present embodiment. In FIG. 11, two wireless communication devices 1-1 and 1-2 are connected to the communication network 10. Note that the configuration of the wireless communication devices 1-1 and 1-2 illustrated in FIG. 11 is similar to the configuration of the wireless communication device 1 illustrated in FIG. 2, but to distinguish between the configuration of the wireless communication devices 1-1 and 1-2, the communication processing unit 11 is denoted the communication processing units 11a-1 to 11c-1, and the communication processing units 11a-2 to 11c-2. The handover control unit 12 and the network control unit 13 are denoted using similar signs.

Since the wireless communication devices 1-1 and 1-2 are connected through the communication network 10, the handover control unit 12 included in one of the wireless communication devices becomes the master, and conducts control of the communication processing units 11 in both of the wireless communication devices as well as the acquisition and updating of the terminal information management table through the communication network 10. Meanwhile, the handover control unit 12 that is not the master becomes a slave.

The method of selecting the handover control unit 12 to act as the master may be, for example, a method of treating the handover control unit 12 of the wireless communication device that booted up first as the master. Specifically, when the wireless communication device 1-1 boots up, the wireless communication device 1-1 broadcasts a probe request to the other wireless communication device 1-2 connected to the communication network 10 after boot-up. If the wireless communication device 1-2 has already booted up and is operating as the master, the wireless communication device 1-2 returns a probe response to the wireless communication device 1-1. The wireless communication device 1-1 operates as a slave in the case of receiving a probe response, and operates as the master in the case in which a probe response is not returned within a fixed period of time.

Note that master and slave may also be changed after deciding the master. For example, if the wireless communication device that includes the handover control unit operating as the master suspends or stops operation, or if the load on the handover control unit becomes intensive and the master is to be changed to a handover control unit with a less-intensive load to avoid affecting system performance, the wireless communication device may change the master to a slave after the master has been decided.

In addition, in consideration of network latency, the handover control unit 12 in a wireless communication device including a communication processing unit 11 using an application demanding real-time performance (for example, streaming or VoIP) may become the master.

<Selection of Handover Destination Candidate>

Figure 12:
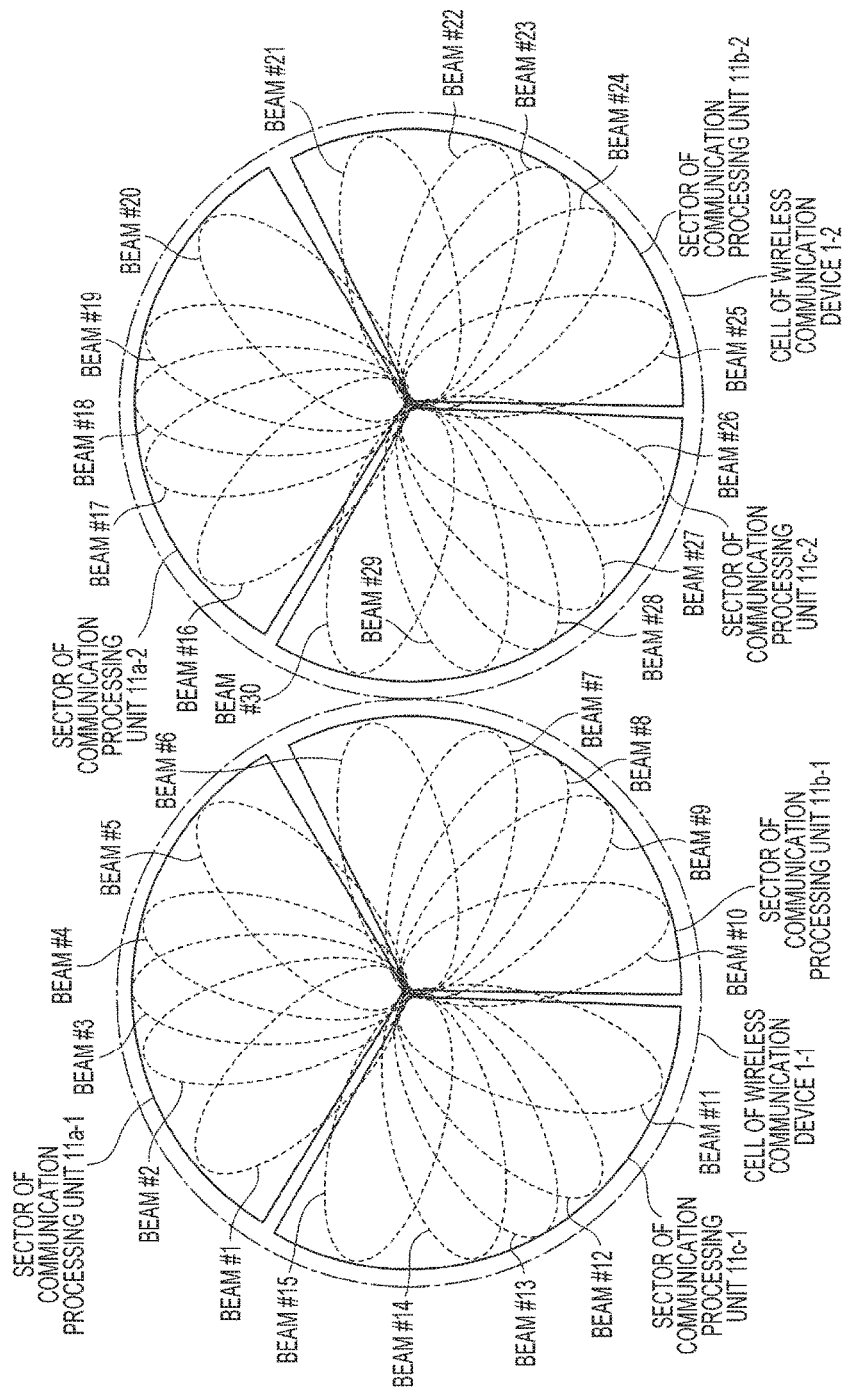
FIG. 12 is a diagram illustrating an example of communication areas formed by two wireless communication devices.

FIG. 12 is a diagram illustrating an example of the communication areas of two wireless communication devices. FIG. 12 illustrates a state in which two communication areas similar to the communication area described with reference to FIG. 6 are adjacent to each other, and thus detailed description will be reduced or omitted. Note that, although not illustrated, the wireless communication devices 1-1 and 1-2 are positioned in the approximate center of each cell, respectively. In FIG. 12, the sectors of the communication processing units 11a-1 to 11c-1 of the wireless communication device 1-1 and the sectors of the communication processing units 11a-2 to 11c-2 of the wireless communication device 1-2 are arranged next to each other. In addition, to avoid duplicate beam IDs between the wireless communication device 1-1 and the wireless communication device 1-2, different beam IDs are given to each.

FIG. 12 will be used to describe a method of selecting the communication processing unit 11 to act as the handover destination candidate. The wireless terminal 2 is connected to the communication processing unit 11a-1 using Beam #5. Additionally, the handover control unit 12 acting as the master is the handover control unit 12-2 of the wireless communication device 1-2.

In Embodiment 1, or in other words, in the case of considering a single wireless communication device, the handover destination candidate is the communication processing unit 11b-1.

In the present embodiment, the sectors adjacent to Beam #5 are the sector of the communication processing unit 11b-1, the sector of the communication processing unit 11a-2, and the sector of the communication processing unit 11c-2. For this reason, if the RSSI becomes less than or equal to a threshold value as a result of the wireless terminal 2 changing its direction of movement, for example, the communication processing units 11a-2 and 11c-2 of the wireless communication device 1-2 also become handover destination candidates. When the wireless communication devices 1-1 and 1-2 are installed, the positional relationship between the two (the positional relationship of the multiple cells and of the sectors inside the cells) may be ascertained, and thus the handover control unit 12 may select both of the wireless communication devices 1-2 and 1-2 as handover destination candidates. Consequently, the handover control unit 12-2 acting as the master issues a beam change notification to the communication processing units 11b-1, 11a-2, and 11c-2.

Since the other steps are similar to Embodiment 1, further description herein will be omitted.

If the result of the handover control is that the wireless terminal 2 is connected to the communication processing unit 11c-2, the communication processing unit 11c-2 issues a training completion notification to the handover control unit 12-2.

The handover control unit 12-2, based on the training completion notification from the communication processing unit 11c-2, issues a handover completion notification to the communication processing units 11b-1, 11a-2, and 11c-2, and ends the handover control.

As described above, in the present embodiment, even if a plurality of the wireless communication device 1 described in Embodiment 1 are connected to the network and the cells of the multiple wireless communication devices 1 are adjacent to each other, since the multiple wireless communication devices 1 are able to ascertain the positional relationship with each other (the positional relationship of the multiple cells and the positional relationship of the sectors inside the cells), conducting the handover control makes it possible to minimize reductions in communication efficiency. Furthermore, the handover control unit 12 included in one of the multiple wireless communication devices 1 becomes the master and is able to execute the handover control.

(Modification 1 of Embodiment 2)

Embodiment 2 describes a case in which multiple wireless communication devices including a handover control unit are connected to the same communication network. Modification 1 of Embodiment 2 describes a case in which multiple wireless communication devices not including a handover control unit are connected to the same communication network, and in addition, a device including a handover control unit is connected to the same communication network.

As an example, a case will be described in which the wireless communication devices do not include the handover control unit, while a network control device (for example, an access point controller or access point coordinator (APC)) connected to the network includes the handover control unit.

Figure 13:
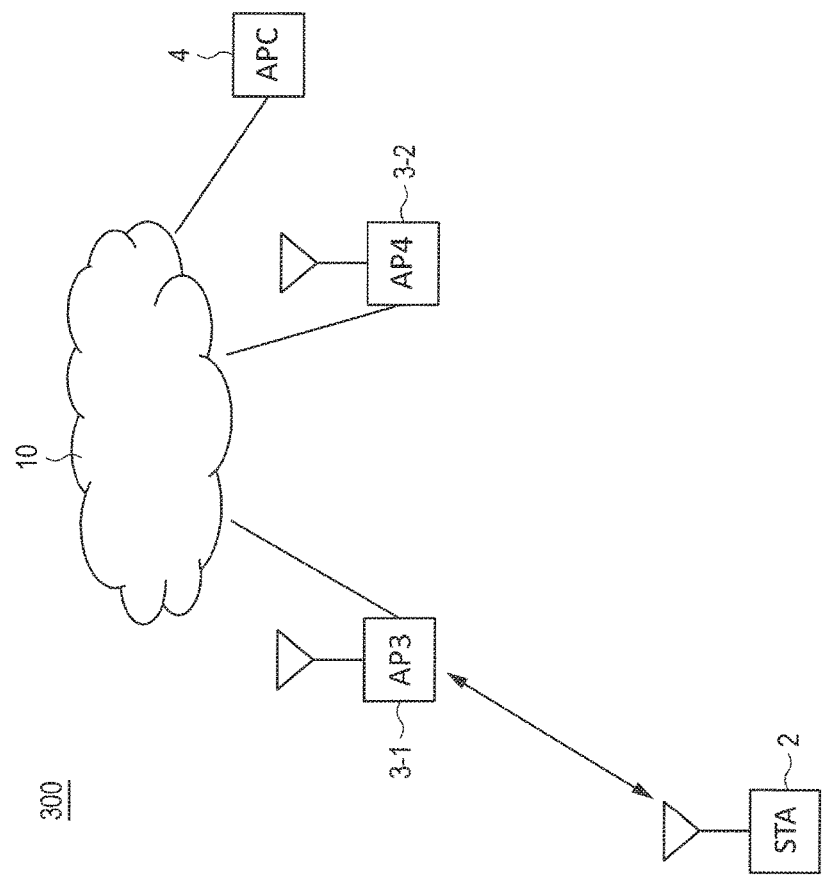
FIG. 13 is a system configuration diagram illustrating an example of the configuration of a communication system according to Modification 1 of Embodiment 2.

FIG. 13 is a system configuration diagram illustrating an example of the configuration of a communication system 300 according to Modification 1 of Embodiment 2. In FIG. 13, wireless communication devices (AP3, AP4) 3-1 and 3-2 as well as a network control device (APC) 4 are connected to the communication network 10. Also, a wireless terminal (STA) 2 is connected to the wireless communication device 3-1.

Figure 14:
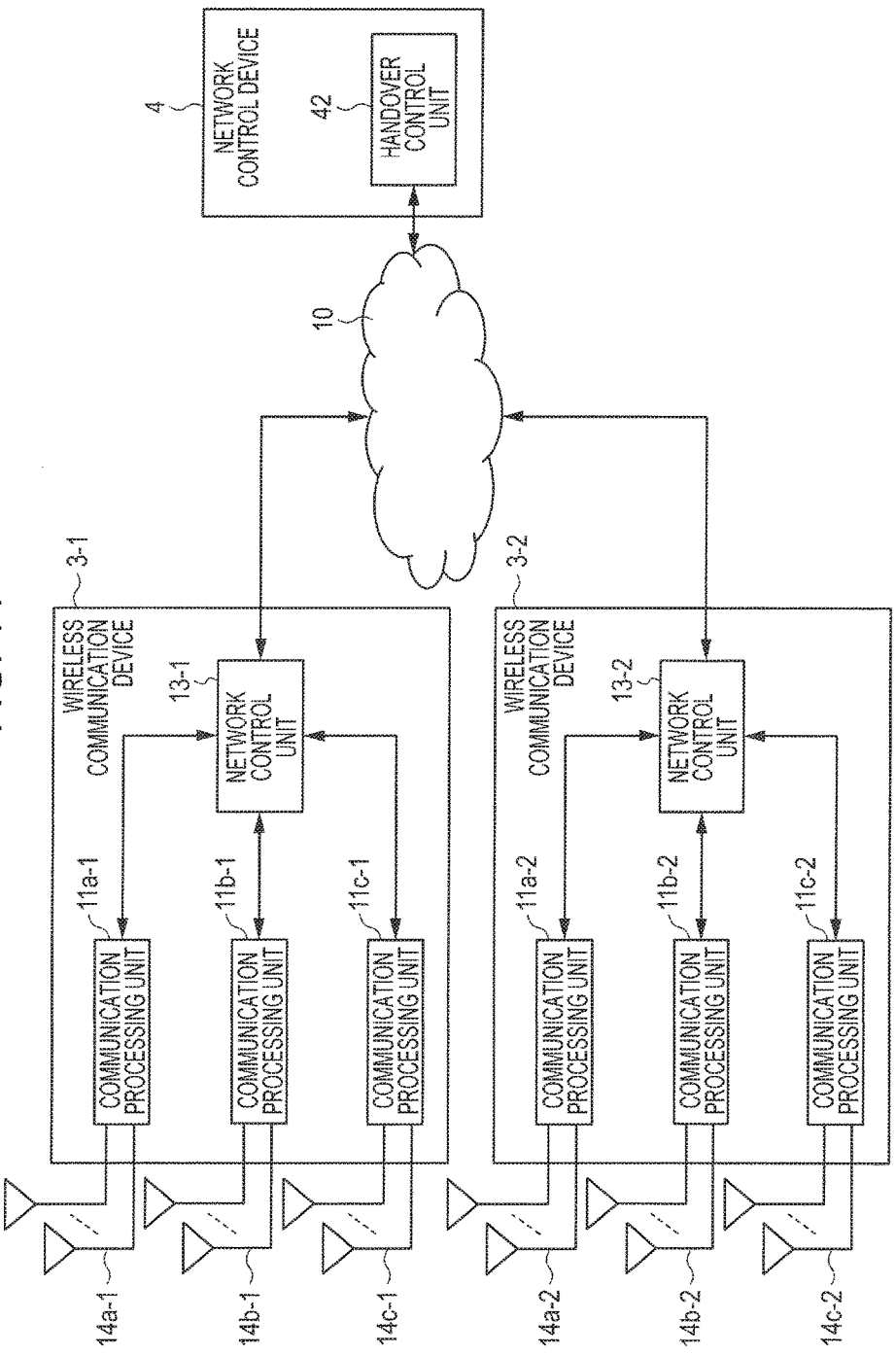
FIG. 14 is a block diagram illustrating an example of the configuration of a wireless communication device and a network control device according to Modification 1 of Embodiment 2.

FIG. 14 is a block diagram illustrating an example of the configuration of the wireless communication devices 3-1 and 3-2 as well as the network control device 4 according to Modification 1 of Embodiment 2. Compared to the configuration of the wireless communication device 1 of Embodiment 1, the wireless communication devices 3-1 and 3-2 illustrated in FIG. 14 have a similar configuration except for not including a handover control unit, and thus detailed description will be omitted.

The network control device 4 includes a handover control unit 42 and a communication unit (not illustrated). The handover control unit 42 conducts control of the communication processing units 11 of the wireless communication devices 3-1 and 3-2 as well the acquisition and updating of the terminal information management table through the communication unit and the communication network 10. In other words, the configuration of Modification 1 of Embodiment 2 is a configuration in which the handover control unit 12 that operates as the master in Embodiment 2 has been replaced by the handover control unit 42 of the network control device 4. Consequently, since the specific processes are similar to Embodiment 2, detailed description will be omitted.

Note that although Modification 1 of Embodiment 2 describes a case in which multiple wireless communication devices not including a handover control unit are connected to the same communication network, and in addition, a device including a handover control unit is connected to the same communication network, the present disclosure is not limited thereto. For example, the operation is similar even in a case in which one wireless communication device not including a handover control unit is connected to the same communication network, and a device including a handover control unit is connected to the same communication network.

(Modification 2 of Embodiment 2)

Modification 2 of Embodiment 2 describes a case in which multiple wireless communication devices including a handover control unit are connected to the same network, and in addition, a network control device including a handover control unit is connected to the same network.

Figure 15:
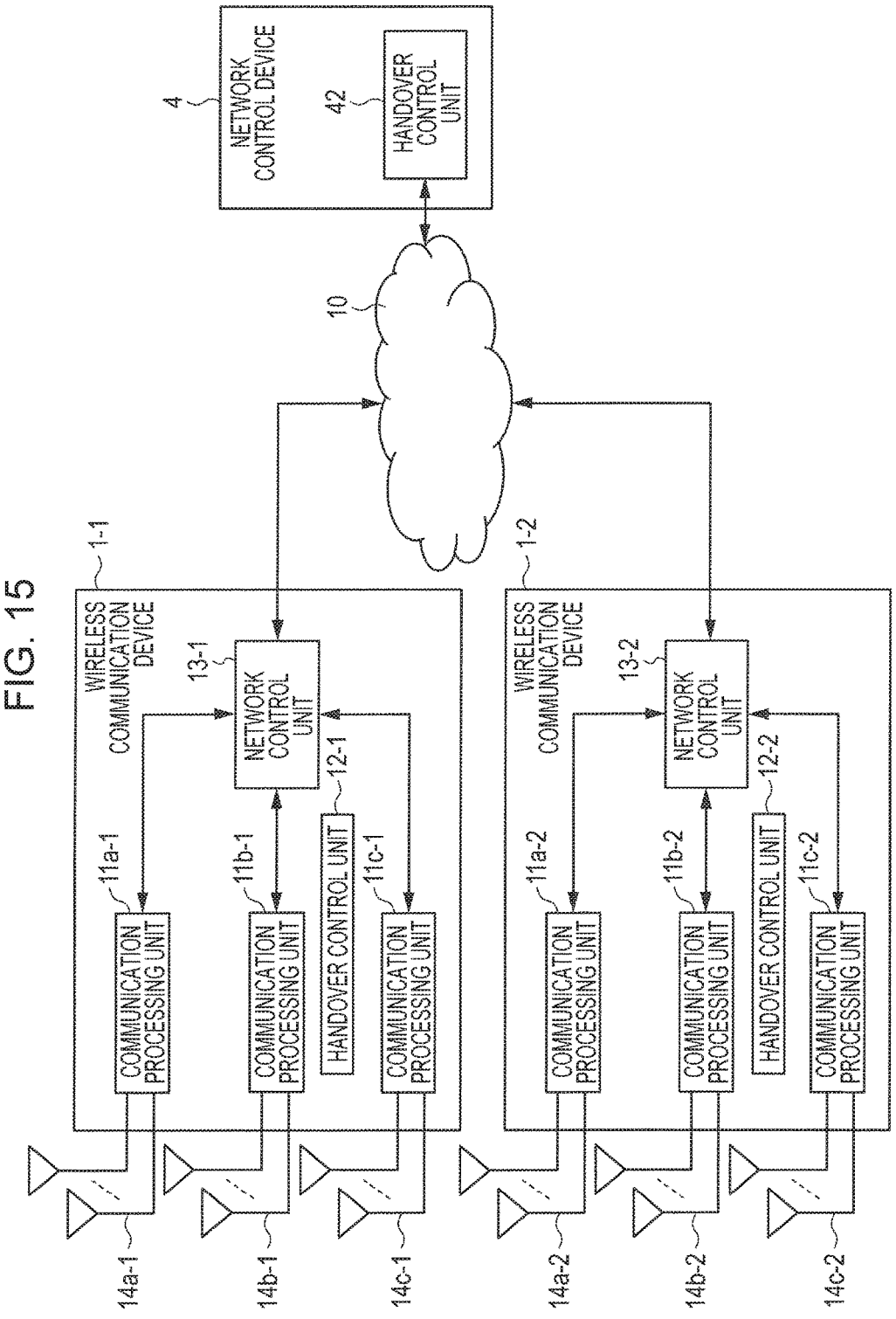
FIG. 15 is a block diagram illustrating an example of the configuration of a wireless communication device and a network control device according to Modification 2 of Embodiment 2.

FIG. 15 is a block diagram illustrating an example of the configuration of the wireless communication devices 1-1 and 1-2 as well as the network control device 4 according to Modification 2 of Embodiment 2. Note that in FIG. 15, parts of the configuration similar to FIG. 11 are denoted with the same reference signs, and description thereof will be reduced or omitted.

In FIG. 15, each of the wireless communication devices 1-1 and 1-2 includes the handover control unit 12, while the network control device 4 connected to the communication network 10 includes the handover control unit 42. In FIG. 15, the handover control unit 42 of the network control device 4 is the master, while all of the handover control units 12 (12-1, 12-2) in the wireless communication devices 1-1 and 1-2 are slaves. Since the operation is similar to that described in Embodiment 2, detailed description will be omitted.

Note that Modifications 1 and 2 of Embodiment 2 describe a case in which the network control device 4 is connected to the same network that the wireless communication devices 1 are connected to. Although not illustrated, even if the network to which the wireless communication devices 1 are connected is different from the network to which the network control device 4 is connected, and the two networks are connected to each other, the wireless communication devices 1 are able to obtain the same advantageous effects as the case of Modifications 1 and 2 of Embodiment 2.

As described above, in Modification 1 and Modification 2 of Embodiment 2, besides the multiple wireless communication devices, a network control device including a handover control unit is connected to the communication network. The handover control unit of the network control device performs handover control for the wireless communication devices through the communication network. For this reason, handover control may be conducted regardless of whether the multiple wireless communication devices include or do not include a handover control unit.

Note that in FIG. 9, a case is described in which a beacon transmitted by the communication processing unit 11 is transmitted with the beam corresponding to one beam ID, but the beacon may also be transmitted using multiple beams. The case of transmitting a beacon using multiple beams will be described using FIGS. 16A and 16B.

FIG. 16A is a diagram illustrating an example of a beacon transmission method. FIG. 16A illustrates a situation in which the communication processing unit 11a successively transmits beacons. In FIG. 16A, the communication processing unit 11a changes the beam ID from #1 to #5 and transmits multiple beacons, that is, a beacon group. Each transmitted beacon has a different beam ID, but the type of beacon is the same. In FIG. 9, the communication processing unit 11a periodically transmits a single beacon, but in FIG. 16A, the communication processing unit 11a periodically transmits a beacon group.

To apply FIG. 16A to the present disclosure, the process in step S509 of FIG. 7 is changed, for example. In step S509 of FIG. 7, the communication processing unit 11 acting as the handover source transmits a beacon using the beam corresponding to the beam ID used for handover, according to a request from the handover control unit 12 (FIGS. 9, S911 and S912). However, in FIG. 16A, for the communication processing unit 11 acting as the handover source to transmit a beacon group, the beam ID to transmit is changed for each beacon.

FIG. 16B will be referenced to describe an example of a method by which the communication processing unit 11a transmits a beacon group in the case in which the communication processing unit 11a is the communication processing unit 11 acting as the handover source, and the wireless terminal that had been connected using Beam #5 (a beam on the end of a sector) conducts handover, for example.

In FIG. 16B, the communication processing unit 11a changes the beam IDs and transmits all beacons in the beacon group with the beam corresponding to beam ID #3 (the beam in the center of the sector). Note that the communication processing unit 11a may also transmit beacons in the beacon group with the beams corresponding to the beam IDs from #1 to #3 (beams distanced from Beam #5). Even when such a method is used, it is possible to prevent the wireless terminal conducting handover from reconnecting to the communication processing unit 11 acting as the handover source. By using such a method, the present disclosure may be applied even to systems in which beacon groups are transmitted.

Note that the millimeter wave communication implemented in the wireless communication device is taken to be IEEE 802.11ad in the foregoing embodiments, but is not limited thereto. For example, the millimeter wave communication implemented in the wireless communication device may also be taken to be any of various other types of wireless communication having directionality, such as IEEE 802.15.3c. Similarly, the beamforming training likewise is not limited to the SLS discussed earlier.

In addition, although the foregoing embodiments presuppose millimeter wave communication, the communication scheme is not limited to millimeter wave communication, insofar as the communication scheme has directionality.

In addition, although the foregoing embodiments refer to the wireless communication device as an access point (AP), each communication processing unit may also be referred to as a single access point.

In addition, the number and shape of the beam pattern of the communication processing unit is not limited to the example described in FIG. 5 and the like.

In addition, in the foregoing embodiments, the communication processing units inside the wireless communication device are described as using IEEE 802.11ad, but the three communication processing units may also use respectively different communication schemes (communication standards). In this case, the wireless terminal must support the corresponding multiple communication schemes (communication standards).

In addition, the number of communication processing units is not limited to the example described in FIG. 2.

In addition, in the foregoing embodiments, the RSSI is used as the wireless quality information, but another quantity may also be used, such as the received power, the signal-to-noise ratio (SNR), or the signal-to-interference-plus-noise ratio (SINR), for example.

Also, in step S504 of FIG. 7, if the beam pattern is a beam on either end, or in other words, in the case of the communication processing unit 11a, a case of determining whether the beam pattern is Beam #1 or Beam #5 is described, but the present disclosure is not limited thereto. In step S504 of FIG. 7, it may be determined whether or not the beam pattern is a beam within a certain range including a beam on either end. Specifically, in the case of a communication processing unit 11 that covers one sector using beams in N directions (where N is an integer equal to or greater than 2), it may be determined whether or not the beam pattern is a beam up to the Kth beam (where K is an integer equal to or greater than 1, and less than or equal to N/2) starting from a position close to a boundary of the sector. For example, in the case of the communication processing unit 11a, since the sector is covered using beams in five directions, it may be determined whether or not the beam pattern is a beam up to the second beam starting from a position close to a boundary of the sector. In other words, it may be determined not only whether or not the beam pattern is Beam #1 or Beam #5, but also whether or not the beam pattern is Beam #2 or Beam #4.

In addition, in step S505 of FIG. 7, a threshold value on the wireless quality information may be set for each beam pattern or for each communication processing unit.

In addition, in step S505 of FIG. 7, the threshold value may also be changed dynamically. Specifically, after causing the communication processing unit to operate, the device temperature rises due to the generation of heat. A rise in the device temperature degrades the transmission and reception performance, and thus if the threshold value is fixed, handover may be executed unintentionally for the communication processing unit. To prevent unintentional handover, for example, the communication processing unit may measure the device temperature periodically, and change the threshold value according to the device temperature.

In addition, in step S513 of FIG. 7, the communication processing unit that receives the disconnection notification may change the beam to a default value, or furthermore temporarily suspend the functions of the communication processing unit. Specifically, the communication processing unit may power off, or lower the transmit power, for example.

In addition, the timing at which the handover control unit makes the handover determination is described as being when triggered by the end of the SLS, but is not necessarily limited thereto. For example, the handover determination may also be made on a longer interval than the SLS execution interval. In addition, the handover control unit may also acquire the terminal information management table at an arbitrary timing.

Note that part of the configuration of the wireless communication device may also be disposed physically separated from other parts of the configuration of the wireless communication device. Each separated part must be equipped with a communication circuit for communicating with each other. For example, the handover control unit may be implemented in a controller that controls the network to which the wireless communication device belongs.

Various aspects of embodiments according to the present disclosure include the following.

A wireless communication device according to a first disclosure includes: 1st to Mth communication processing circuitry, respectively corresponding to 1st to Mth sectors (where M is an integer equal to or greater than 2), which in operation, each communicate with a wireless terminal by using a beam in any of N directions (where N is an integer equal to or greater than 2) in each sector; and handover control circuitry, which in operation, instructs the 2nd communication processing circuitry corresponding to the 2nd sector to change a beam used for beacon transmission to a beam closest to a boundary between the 1st sector and the 2nd sector from among the beams in N directions, and switch a communication partner of the wireless terminal from the 1st communication processing circuitry to the 2nd communication processing circuitry, in a case where all of (i) to (ii) are satisfied: (i) the beam used by the 1st communication processing circuitry corresponding to the 1st sector adjacent to the 2nd sector is a beam up to a Kth beam (where K is an integer equal to or greater than 1, and less than or equal to N/2) from the boundary from among the beams in N directions, and (ii) a communication quality between the 1st communication processing circuitry and the wireless terminal is less than or equal to a threshold value.

According to a wireless communication device according to a second disclosure, in the above wireless communication device according to the first disclosure, the handover control circuitry instructs the 1st communication processing circuitry to change the beam used for the beacon transmission to a beam other than the beam closest to the boundary in the 1st sector.

According to a wireless communication device according to a third disclosure, in the above wireless communication device according to the first disclosure, the beam that the 1st communication processing circuitry uses for communication with the wireless terminal is the beam with the best communication quality from among the beams in N directions.

According to a wireless communication device according to a fourth disclosure, in the above wireless communication device according to the first disclosure, the 1st to Mth communication processing circuitry use a millimeter wave band.

According to a wireless communication device according to a fifth disclosure, in the above wireless communication device according to the first disclosure, each of the 1st to Mth communication processing circuitry includes a management table that manages information about a communication quality with the wireless terminal currently connected, and a beam used for communication with the wireless terminal currently connected, and the handover control circuitry determines, based on the management table, whether or not to switch the 1st to Mth communication processing circuitry to connect to the wireless terminal.

A wireless communication method according to a sixth disclosure includes: communicating with a wireless terminal by using a beam in any of N directions (where N is an integer equal to or greater than 2) in 1st communication processing circuitry of a wireless communication device corresponding to a 1st sector adjacent to a 2nd sector from among 1st to Mth sectors (where M is an integer equal to or greater than 2); and instructing the 2nd communication processing circuitry of the wireless communication device corresponding to the 2nd sector to change a beam used for beacon transmission to a beam closest to the boundary, and switch a communication partner of the wireless terminal from the 1st communication processing circuitry to the 2nd communication processing circuitry, in a case where all of (i) to (ii) are satisfied: (i) the beam used by the 1st communication processing circuitry is a beam up to a Kth beam (where K is an integer equal to or greater than 1, and less than or equal to N/2) from a boundary between the 1st sector and the 2nd sector from among the beams in N directions, and (ii) a communication quality between the 1st communication processing circuitry and the wireless terminal is less than or equal to a threshold value.

A control device according to a seventh disclosure includes: communication circuitry, which in operation, connects to a wireless communication device including 1st to Mth communication processing circuitry that communicate with a wireless terminal, the wireless communication device using a beam in any of N directions (where N is an integer equal to or greater than 2) for the communication in any of the 1st to Mth communication processing circuitry respectively corresponding to 1st to Mth sectors (where M is an integer equal to or greater than 2); and handover control circuitry, which in operation, instructions to switch a communication partner of the wireless terminal from any one of the 1st to Mth communication processing circuitry to any one of rest of the 1st to Mth communication processing circuitry, wherein the communication circuitry receives, from the 1st communication processing circuitry of the wireless communication device corresponding to the 1st sector adjacent to the 2nd sector from among the 1st to Mth sectors, a communication quality between the 1st communication processing circuitry of the wireless communication device and the wireless terminal using a beam up to a Kth beam (where K is an integer equal to or greater than 1, and less than or equal to N/2) from a boundary between the 1st sector and the 2nd sector from among the beams in N directions of the 1st communication processing circuitry, and in a case where the received communication quality is less than or equal to a threshold value, the handover control circuitry instructs the 2nd communication processing circuitry of the wireless communication device corresponding to the 2nd sector to change a beam used for beacon transmission to a beam closest to the boundary, and switch the communication partner of the wireless terminal from the 1st communication processing circuitry of the wireless communication device to the 2nd communication processing circuitry of the wireless communication device.

A control method according to an eighth disclosure includes: connecting to a wireless communication device including 1st to Mth communication processing circuitry that communicate with a wireless terminal, the wireless communication device using a beam in any of N directions (where N is an integer equal to or greater than 2) for the communication in each of 1st to Mth sectors (where M is an integer equal to or greater than 2); receiving, from the 1st communication processing circuitry corresponding to the 1st sector adjacent to the 2nd sector from among the 1st to Mth sectors, a communication quality between the 1st communication processing circuitry and the wireless terminal using a beam up to a Kth beam (where K is an integer equal to or greater than 1, and less than or equal to N/2) from a boundary between the 1st sector and the 2nd sector from among the beams in N directions of the 1st communication processing circuitry; and instructing, in a case where the received communication quality is less than or equal to a threshold value, the 2nd communication processing circuitry corresponding to the 2nd sector to change a beam used for beacon transmission to a beam closest to the boundary, and switch a communication partner of the wireless terminal from the 1st communication processing circuitry to the 2nd communication processing circuitry.

The foregoing thus describes various embodiments with reference to the drawings. However, the present disclosure obviously is not limited to such examples. It is clear to persons skilled in the art that various modifications or alterations may occur insofar as they are within the scope stated in the claims, and it is to be understood that such modifications or alterations obviously belong to the technical scope of the present disclosure. Furthermore, the structural elements in the foregoing embodiments may also be combined arbitrarily within a scope that does not depart from the gist of the disclosure.

In addition, each function block used in the description of the foregoing embodiments typically is realized by an LSI chip, that is, an integrated circuit including one or more input terminals and one or more output terminals. The integrated circuit controls each function block used in the description of the foregoing embodiments, and may be provided with inputs and outputs. The function blocks may be realized individually as separate chips, or as a single chip that includes some or all function blocks. Although LSI is discussed herein, the circuit integration methodology may also be referred to as IC, system LSI, super LSI, or ultra LSI, depending on the degree of integration.

Furthermore, the circuit integration methodology is not limited to LSI, and may be also be realized by using special-purpose circuits or general-purpose processors. A field-programmable gate array (FPGA) capable of being programmed after fabrication, or a reconfigurable processor whose circuit cell connections and settings may be reconfigured, may also be used.

Furthermore, if circuit integration technology that may be substituted for LSI appears as a result of progress in semiconductor technology or another derived technology, obviously the new technology may be used to integrate the function blocks. Biotechnology applications and the like are also a possibility.

Note that the present disclosure may be expressed as a wireless communication device, or a control method executed in a control device. Additionally, the present disclosure may also be expressed as a program causing such a control method to be performed by a computer. Furthermore, the present disclosure may also be expressed as a recording medium upon which such a program is recorded in a computer-readable state. In other words, the present disclosure may be expressed in any category from among a device, a method, a program, and a recording medium.

A wireless communication device, a wireless communication method, a control device, and a control method according to the present disclosure are useful as an access point having directionality.

What is claimed is:

1. A wireless communication device, comprising:
   1st to Mth communication processing circuitry, respectively corresponding to 1st to Mth sectors (where M is an integer equal to or greater than 2) which, in operation, each communicate with a wireless terminal by using a beam in any of N directions (where N is an integer equal to or greater than 2) in each sector; and
   handover control circuitry which, in operation, instructs a 2nd communication processing circuitry corresponding to a 2nd sector to change a beam used for beacon transmission to a beam closest to a boundary between the 1st sector and the 2nd sector from among the beams in N directions, and switch a communication partner of the wireless terminal from the 1st communication processing circuitry to the 2nd communication processing circuitry, in a case where all of (i) to (ii) are satisfied: (i) the beam used by the 1st communication processing circuitry corresponding to the 1st sector adjacent to the 2nd sector is a beam up to a Kth beam (where K is an integer equal to or greater than 1, and less than or equal to N/2) from the boundary, and (ii) a communication quality between the 1st communication processing circuitry and the wireless terminal is less than or equal to a threshold value.

2. The wireless communication device according to claim 1, wherein
   the handover control circuitry, in operation, instructs the 1st communication processing circuitry to change the beam used for the beacon transmission to a beam other than the beam closest to the boundary in the 1st sector.

3. The wireless communication device according to claim 1, wherein
   the beam that the 1st communication processing circuitry uses for communication with the wireless terminal is the beam with the best communication quality from among the beams in N directions.

4. The wireless communication device according to claim 1, wherein
   the 1st to Mth communication processing circuitry use a millimeter wave band.

5. The wireless communication device according to claim 1, wherein
   each of the 1st to Mth communication processing circuitry includes a management table that manages information about a communication quality with the wireless terminal currently connected, and a beam used for communication with the wireless terminal currently connected, and
   the handover control circuitry determines, based on the management table, whether or not to switch the 1st to Mth communication processing circuitry to connect to the wireless terminal.

6. A wireless communication method, comprising:
   communicating with a wireless terminal by using a beam in any of N directions (where N is an integer equal to or greater than 2) in 1st communication processing circuitry of a wireless communication device corresponding to a 1st sector adjacent to a 2nd sector from among 1st to Mth sectors (where M is an integer equal to or greater than 2); and
   instructing a 2nd communication processing circuitry of the wireless communication device corresponding to the 2nd sector to change a beam used for beacon transmission to a beam closest to a boundary between the 1st sector and the 2nd sector, and switch a communication partner of the wireless terminal from the 1st communication processing circuitry to the 2nd communication processing circuitry, in a case where all of (i) to (ii) are satisfied: (i) the beam used by the 1st communication processing circuitry is a beam up to a Kth beam (where K is an integer equal to or greater than 1, and less than or equal to N/2) from the boundary from among the beams in N directions, and (ii) a communication quality between the 1st communication processing circuitry and the wireless terminal is less than or equal to a threshold value.

7. A control device, comprising:
   communication circuitry which, in operation, connects to a wireless communication device including 1st to Mth communication processing circuitry that communicate with a wireless terminal, the wireless communication device using a beam in any of N directions (where N is an integer equal to or greater than 2) for the communication in any of the 1st to Mth communication processing circuitry respectively corresponding to 1st to Mth sectors (where M is an integer equal to or greater than 2); and
   handover control circuitry which, in operation, instructs a communication partner of the wireless terminal to switch from any one of the 1st to Mth communication processing circuitry to any one of rest of the 1st to Mth communication processing circuitry, wherein
   the communication circuitry, in operation, receives, from the 1st communication processing circuitry of the wireless communication device corresponding to the 1st sector adjacent to a 2nd sector from among the 1st to Mth sectors, a communication quality between the 1st communication processing circuitry of the wireless communication device and the wireless terminal using a beam up to a Kth beam (where K is an integer equal to or greater than 1, and less than or equal to N/2) from a boundary between the 1st sector and the 2nd sector from among the beams in N directions of the 1st communication processing circuitry, and
   in a case where the received communication quality is less than or equal to a threshold value, the handover control circuitry, in operation, instructs a 2nd communication processing circuitry of the wireless communication device corresponding to the 2nd sector to change a beam used for beacon transmission to a beam closest to the boundary, and switch the communication partner of the wireless terminal from the 1st communication processing circuitry of the wireless communication device to the 2nd communication processing circuitry of the wireless communication device.

8. A control method, comprising:

connecting to a wireless communication device including 1st to Mth communication processing circuitry that communicate with a wireless terminal, the wireless communication device using a beam in any of N directions (where N is an integer equal to or greater than 2) for the communication in each of 1st to Mth sectors (where M is an integer equal to or greater than 2);

receiving, from the 1st communication processing circuitry corresponding to the 1st sector adjacent to a 2nd sector from among the 1st to Mth sectors, a communication quality between the 1st communication processing circuitry and the wireless terminal using a beam up to a Kth beam (where K is an integer equal to or greater than 1, and less than or equal to N/2) from a boundary between the 1st sector and the 2nd sector from among the beams in N directions of the 1st communication processing circuitry; and instructing, in a case where the received communication quality is less than or equal to a threshold value, a 2nd communication processing circuitry corresponding to the 2nd sector to change a beam used for beacon transmission to a beam closest to the boundary, and switch a communication partner of the wireless terminal from the 1st communication processing circuitry to the 2nd communication processing circuitry.

* * * * *